Figure 1:
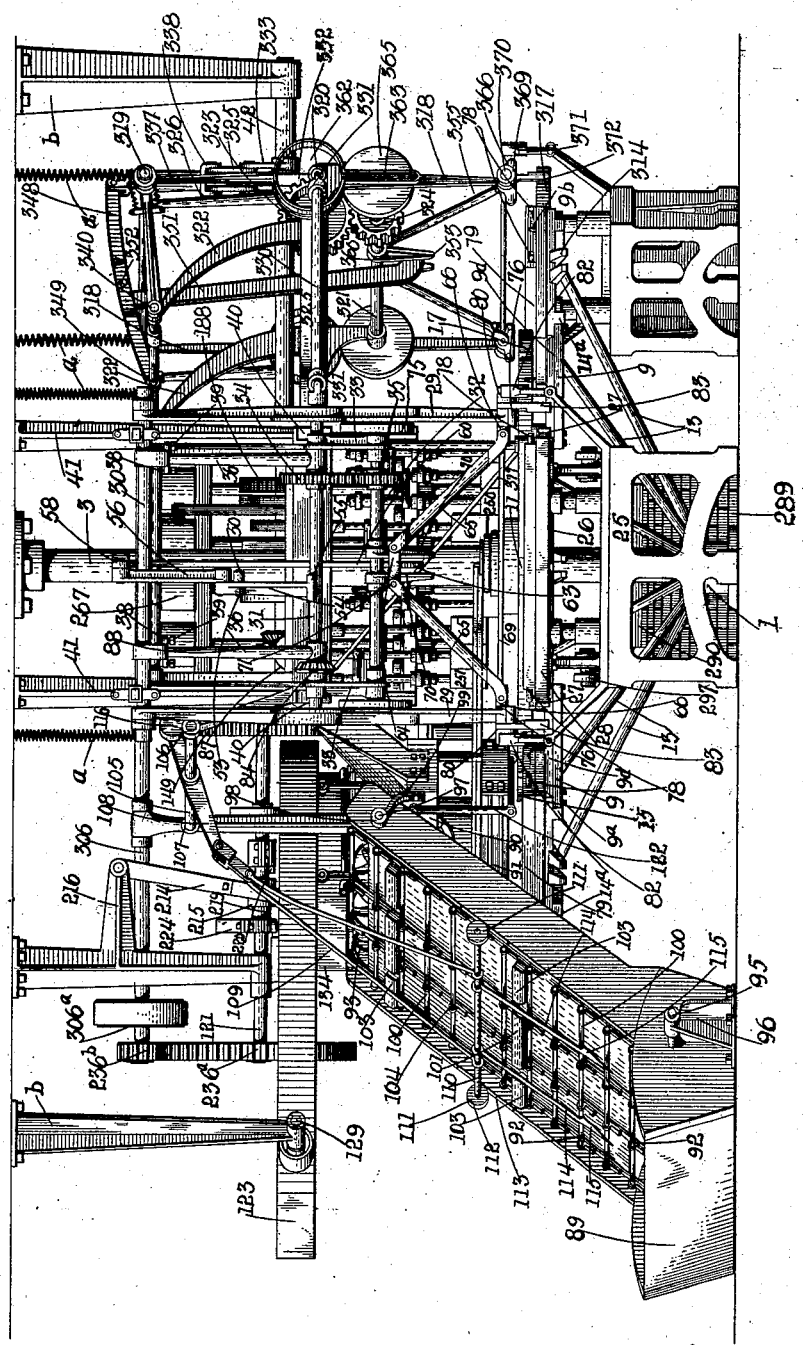

No. 718,442. PATENTED JAN. 13, 1903.
J. A. FIELD.
MOLDING MACHINE.
APPLICATION FILED JULY 20, 1901.
NO MODEL. 27 SHEETS—SHEET 1.

Witnesses.
Inventor.
Jesse A. Field.
By
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 4.
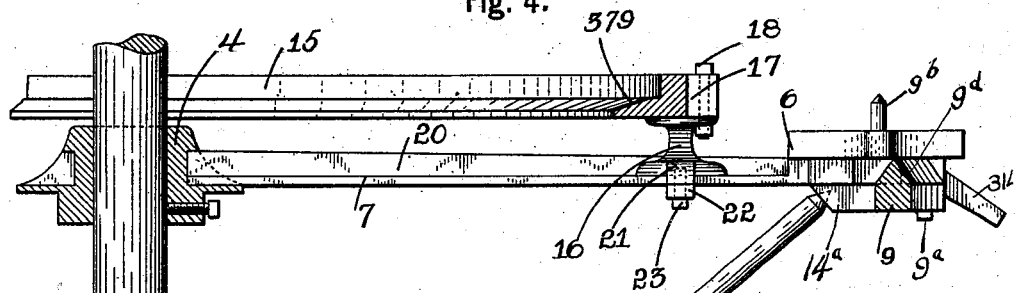
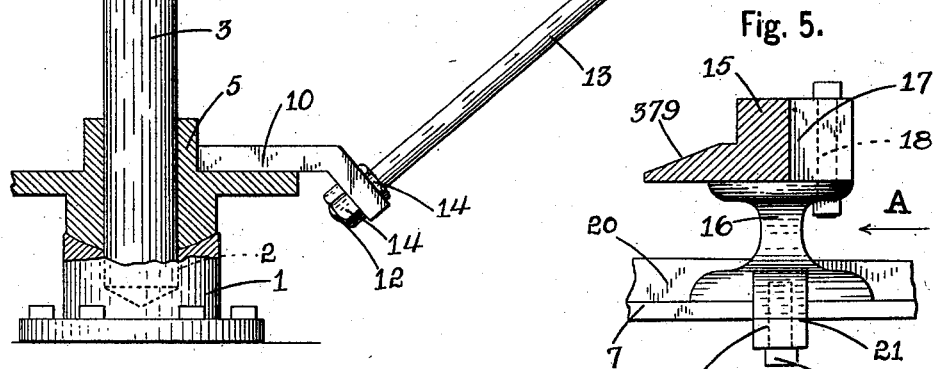
Witnesses.
L. M. Sangster
Geo. A. Neubauer
Inventor.
Jesse A. Field.
By A. J. Sangster
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 5.
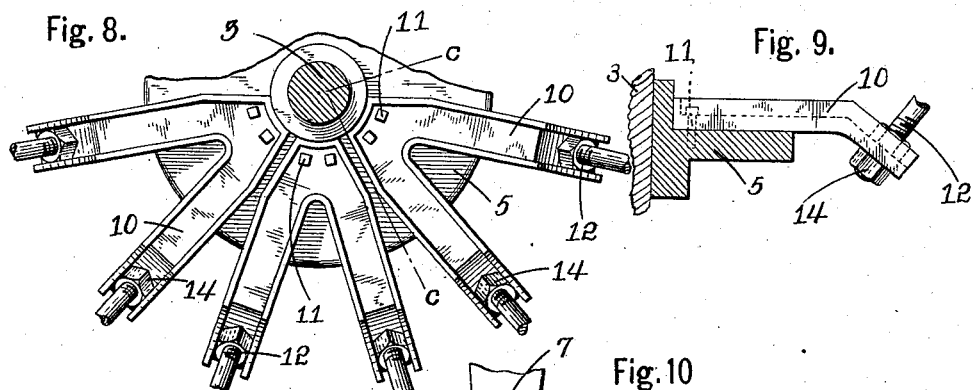
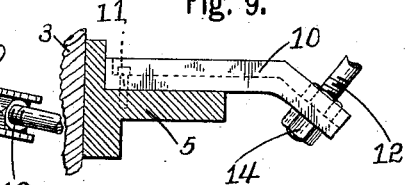
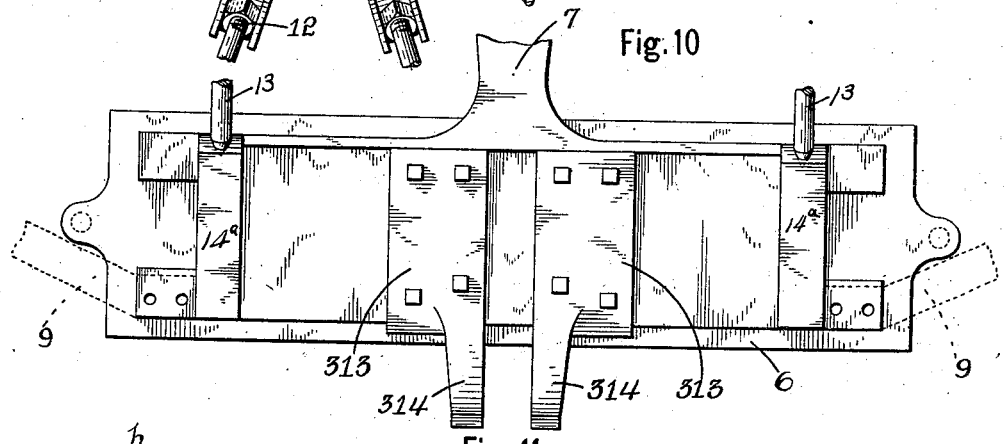
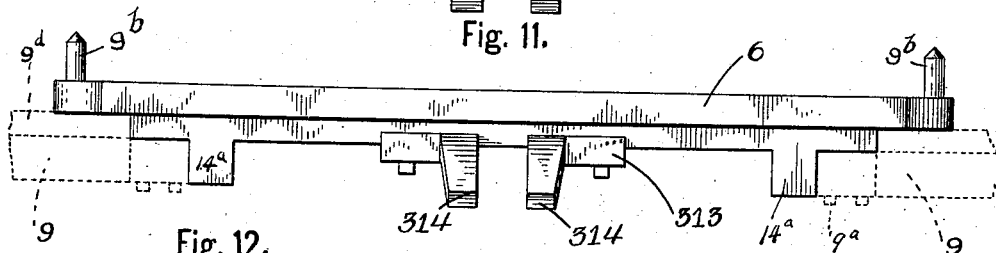
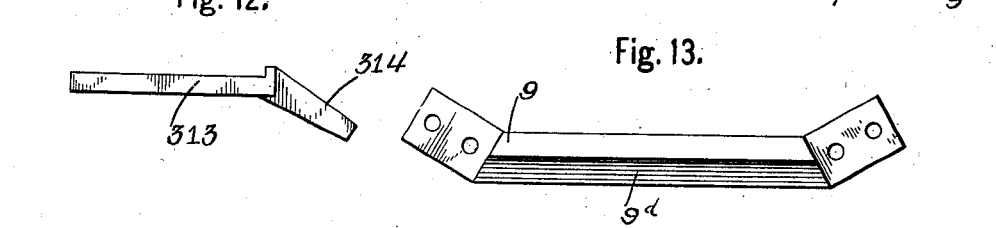
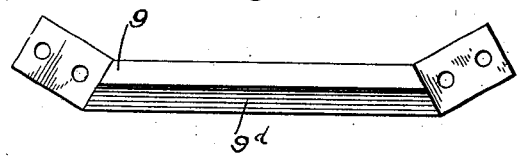
Witnesses.
L. M. Sangster
Geo. A. Hubauer.
Inventor.
Jesse A. Field.
By A. J. Sangster
Attorney.

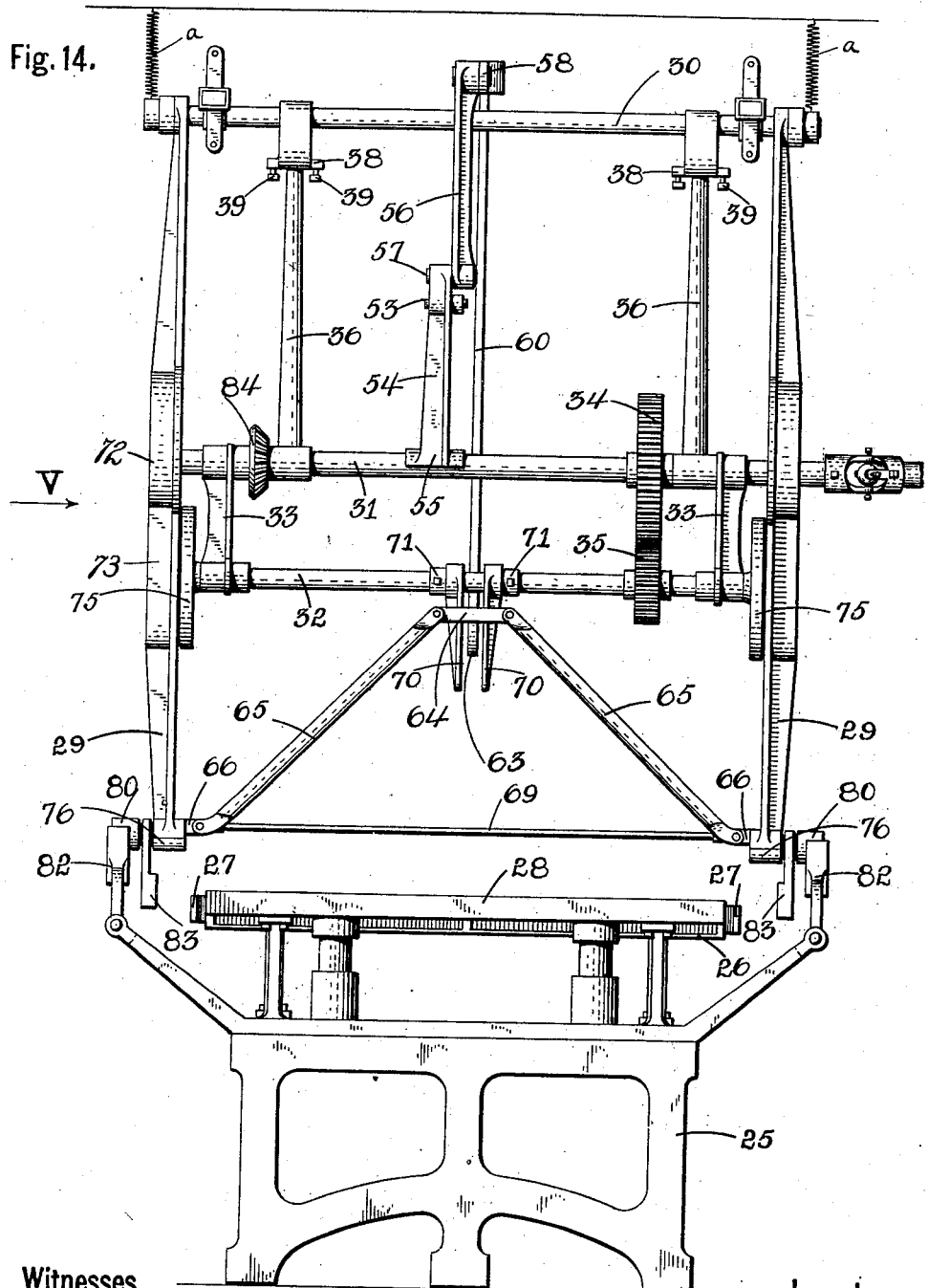

No. 718,442. PATENTED JAN. 13, 1903.
J. A. FIELD.
MOLDING MACHINE.
APPLICATION FILED JULY 20, 1901.
NO MODEL. 27 SHEETS—SHEET 7.

Witnesses.
L. M. Sangster.
Geo. A. Neubauer.

Inventor.
Jesse A. Field.
By A. J. Sangster
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 8.
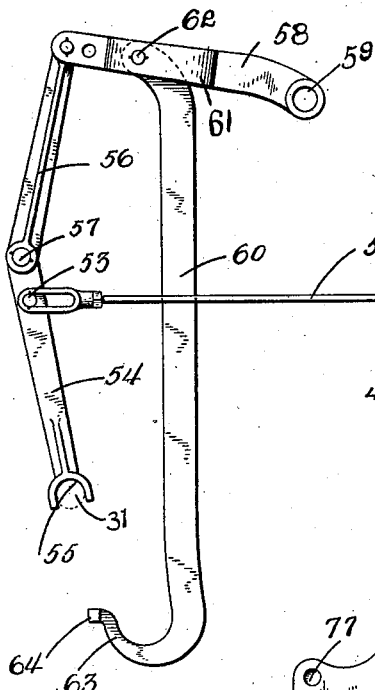
Fig. 18.
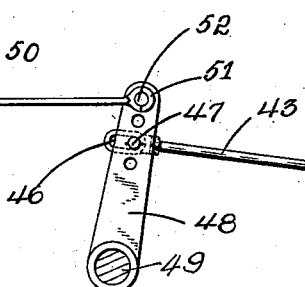
Fig. 19.
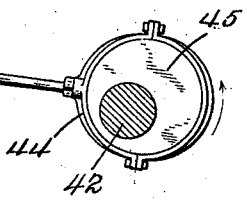
Fig. 20.
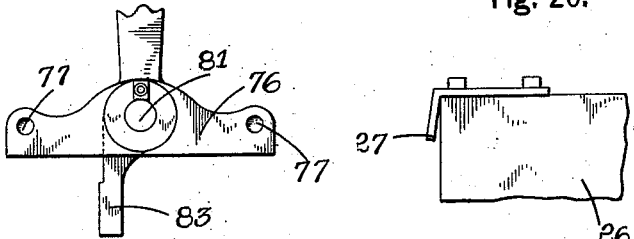
Fig. 21.
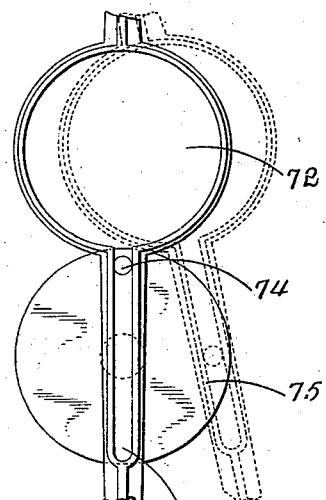
Fig. 22.
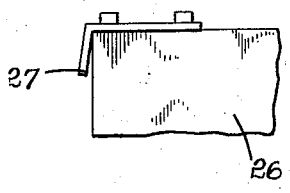
Fig. 23.
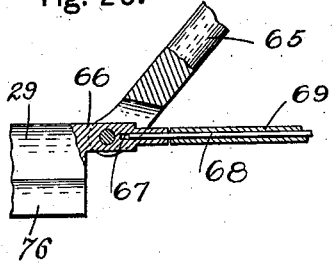
Witnesses.
L. M. Sangster
Geo. A. Neubauer
Inventor.
Jesse A. Field.
By A. J. Sangster
Attorney.

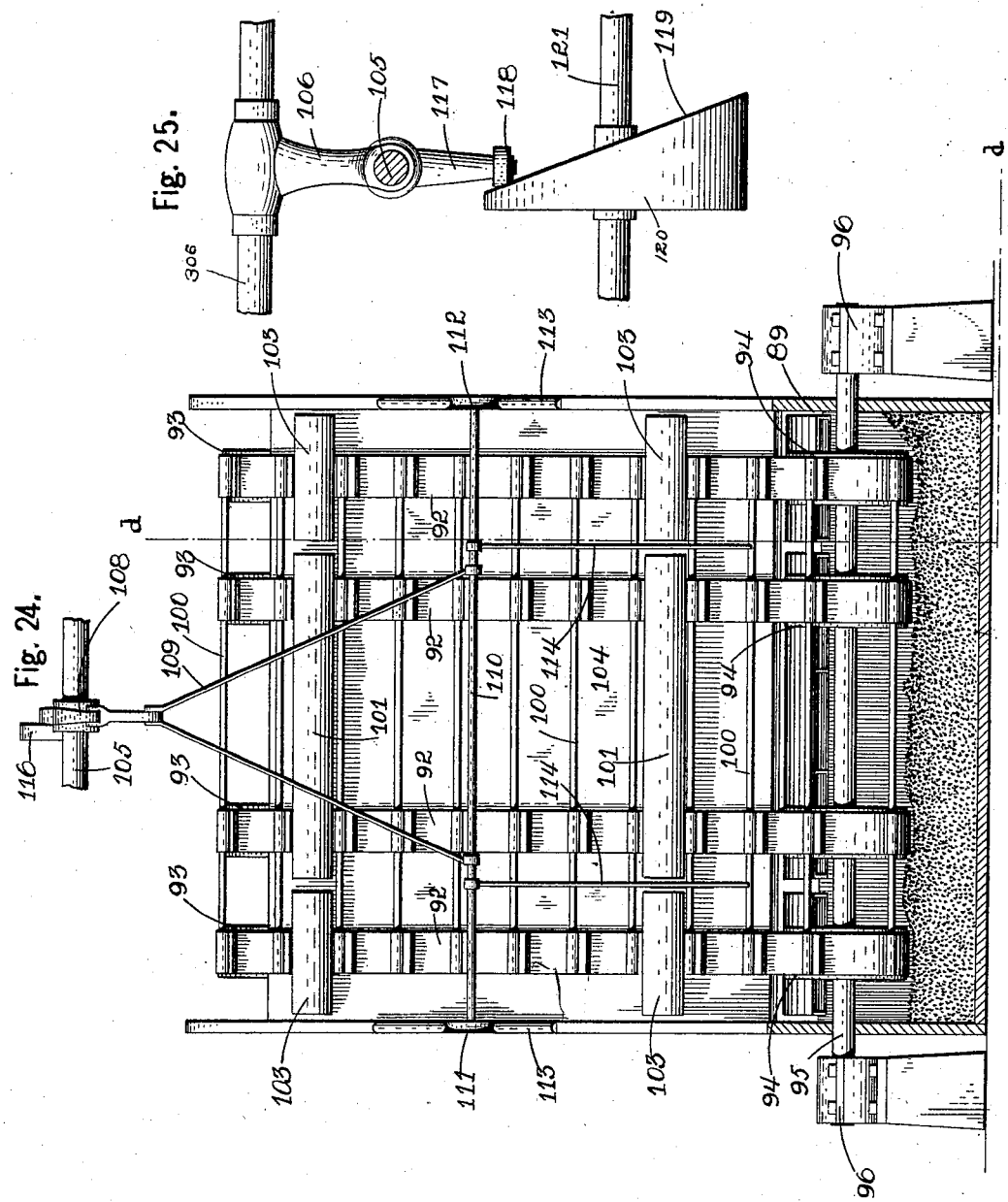

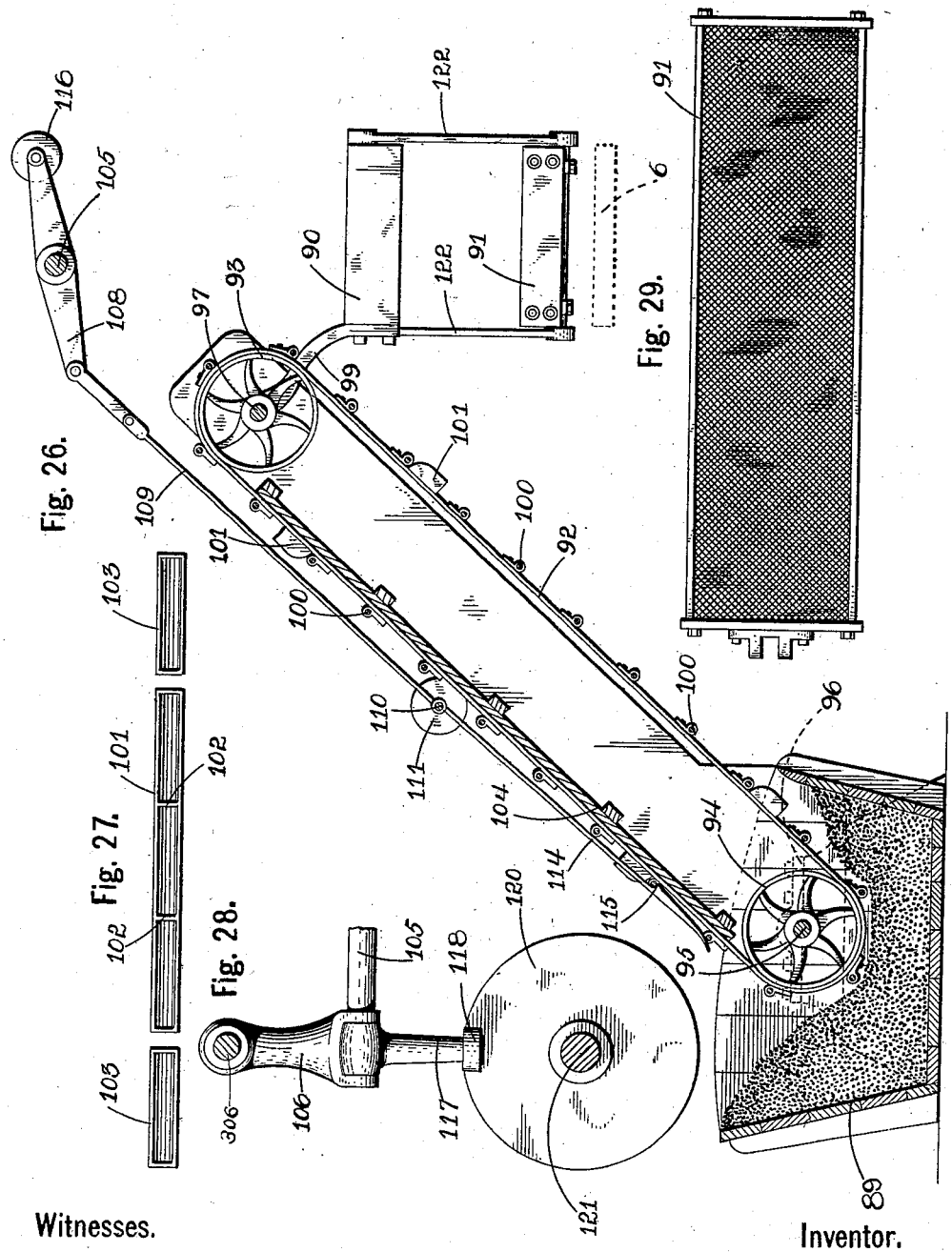

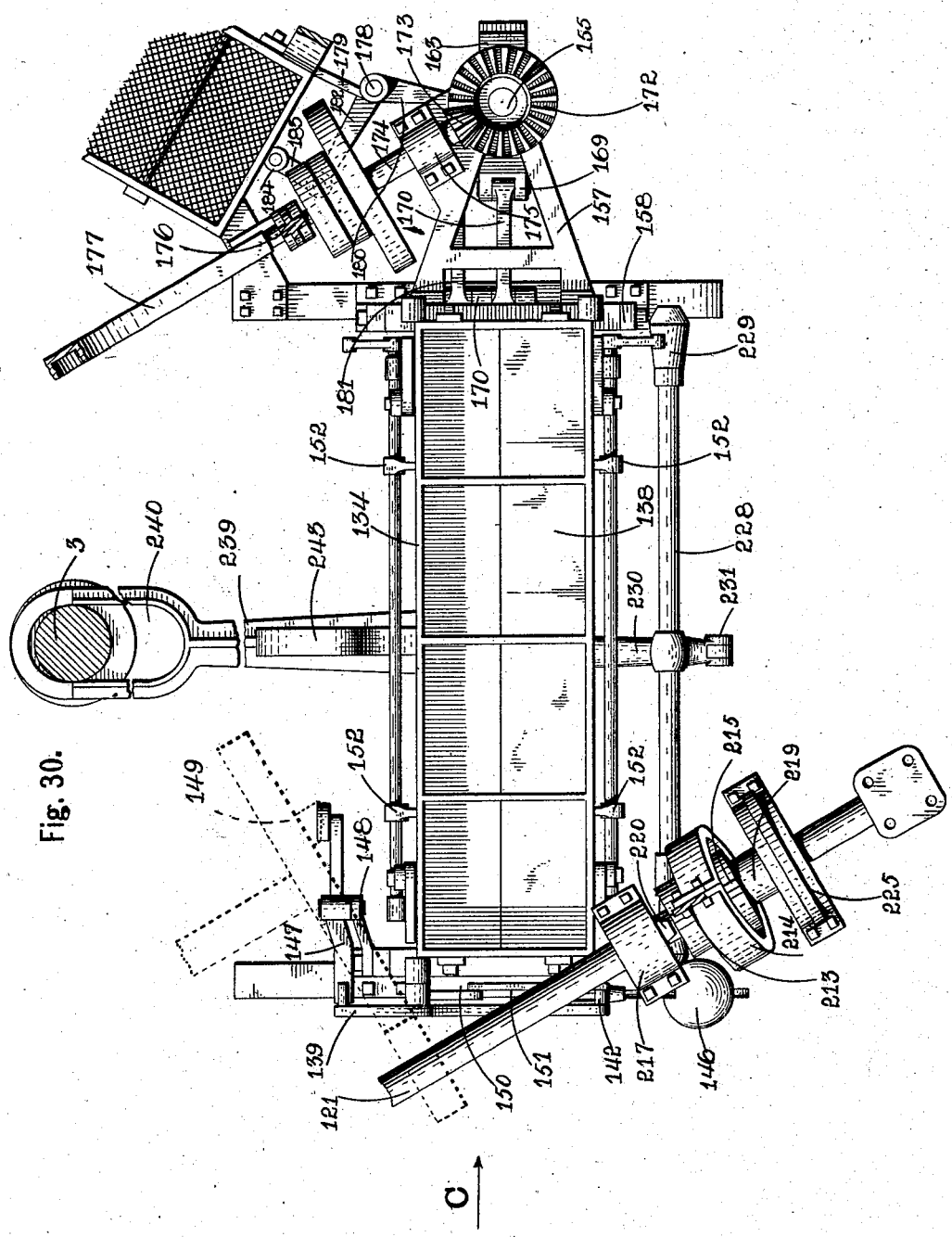

No. 718,442. PATENTED JAN. 13, 1903.
J. A. FIELD.
MOLDING MACHINE.
APPLICATION FILED JULY 20, 1901.
NO MODEL. 27 SHEETS—SHEET 12.
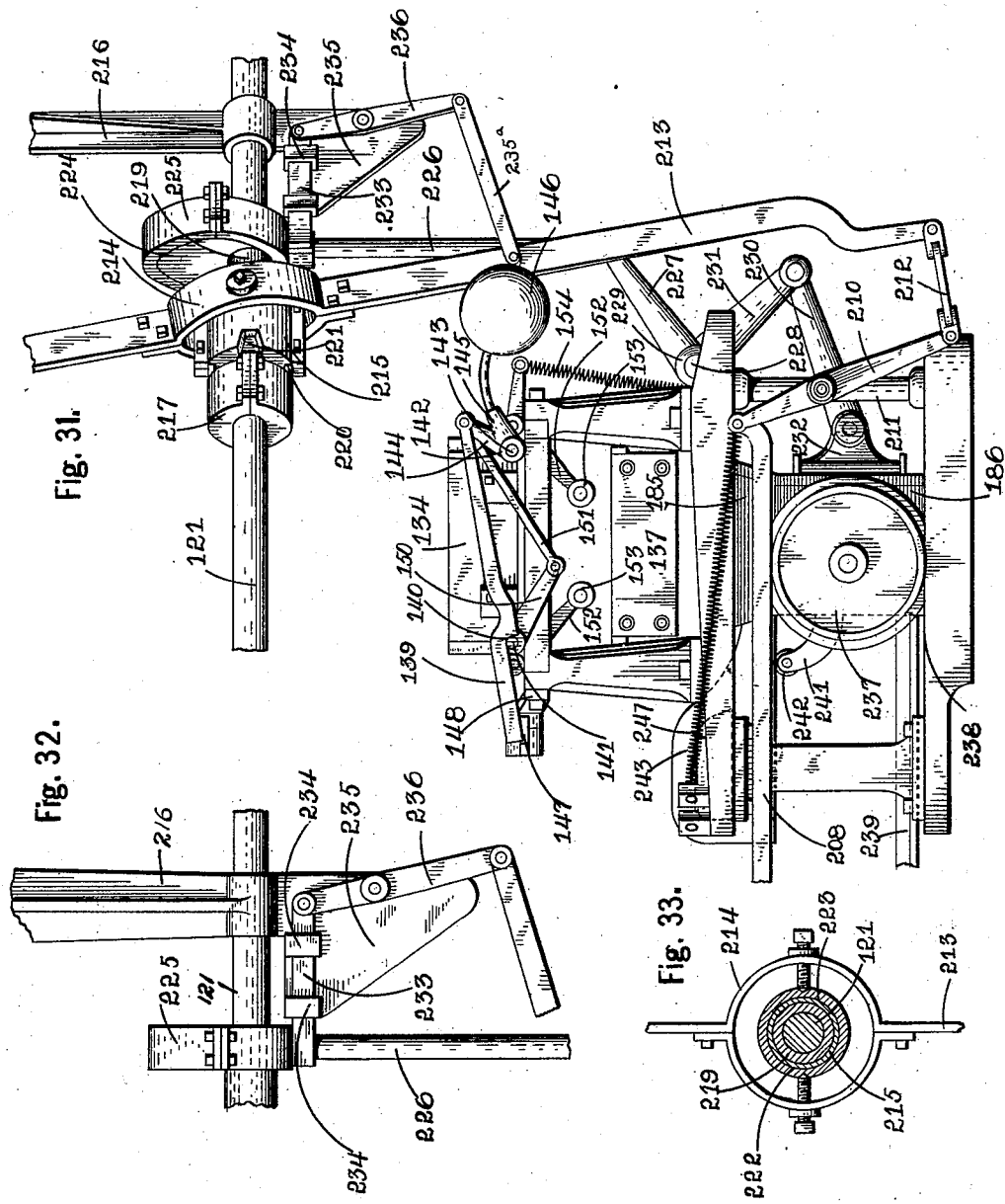
Witnesses.
L. M. Sangster
Geo. A. Neubauer.
Inventor.
Jesse A. Field.
By A. J. Sangster
Attorney.

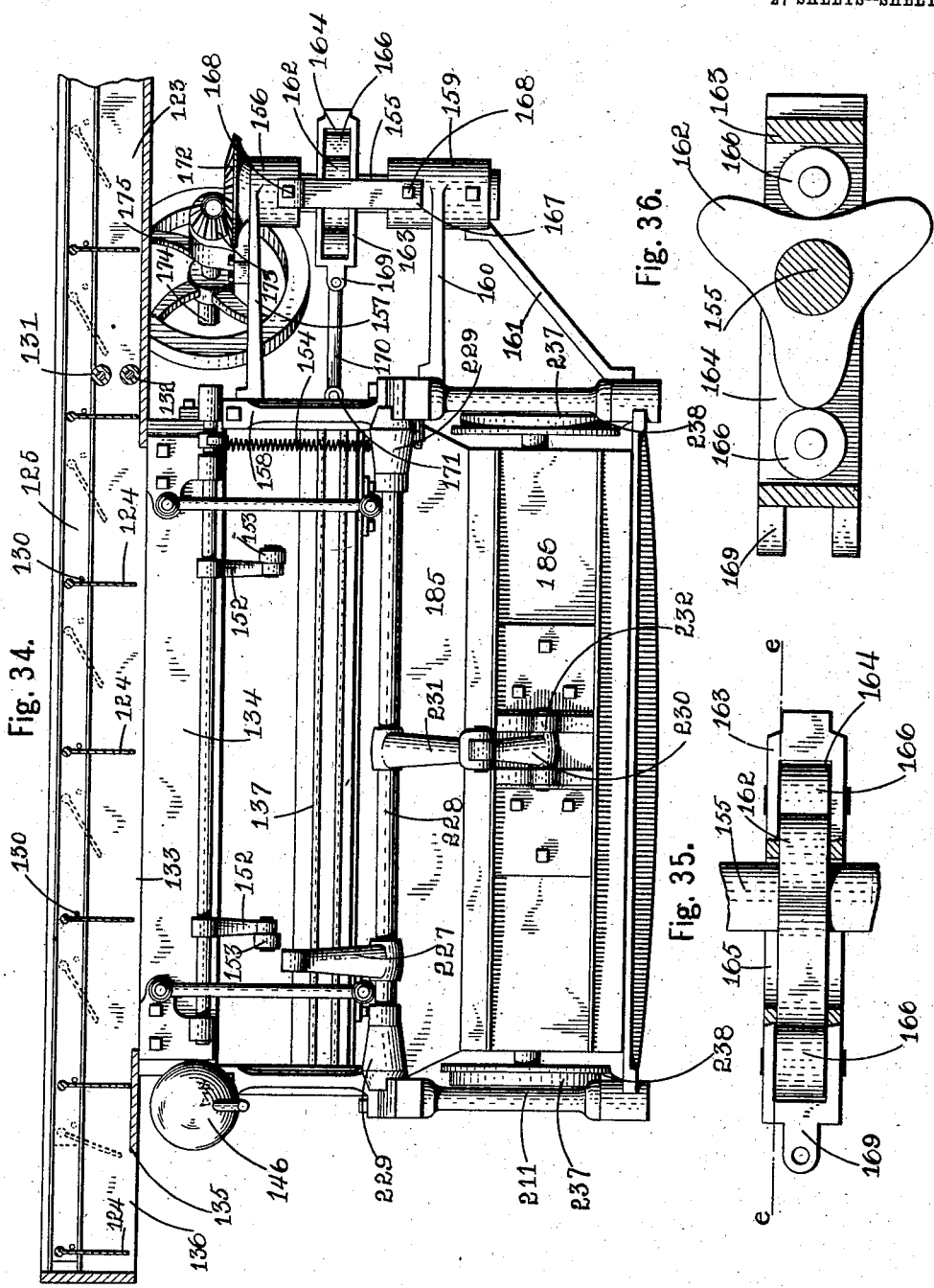

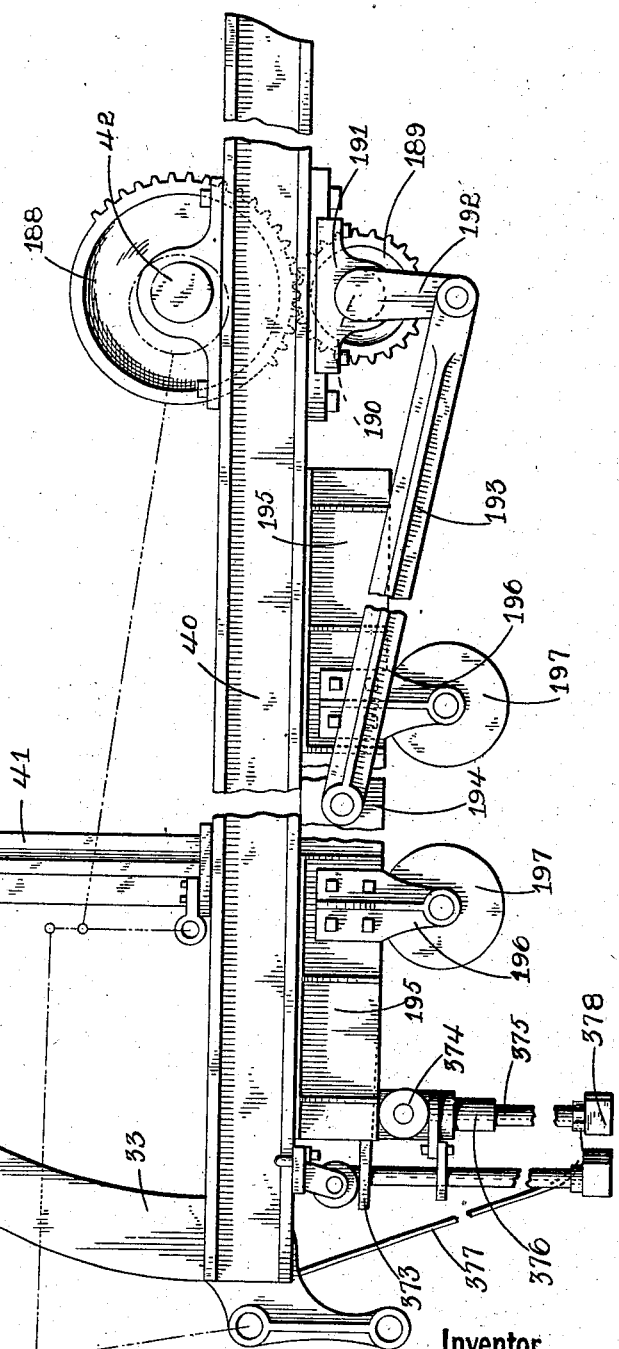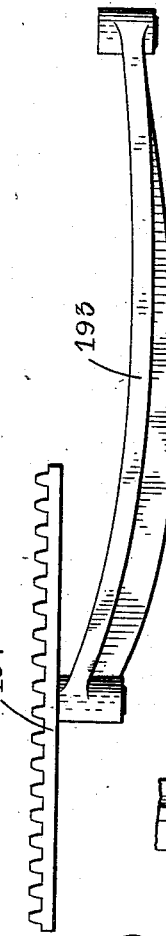

No. 718,442. PATENTED JAN. 13, 1903.
J. A. FIELD.
MOLDING MACHINE.
APPLICATION FILED JULY 20, 1901.
NO MODEL. 27 SHEETS—SHEET 16.
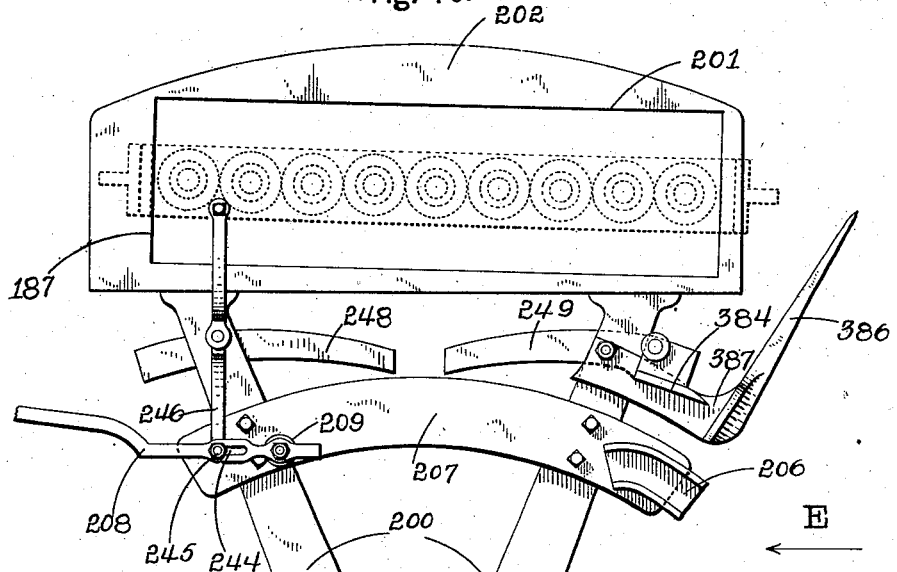
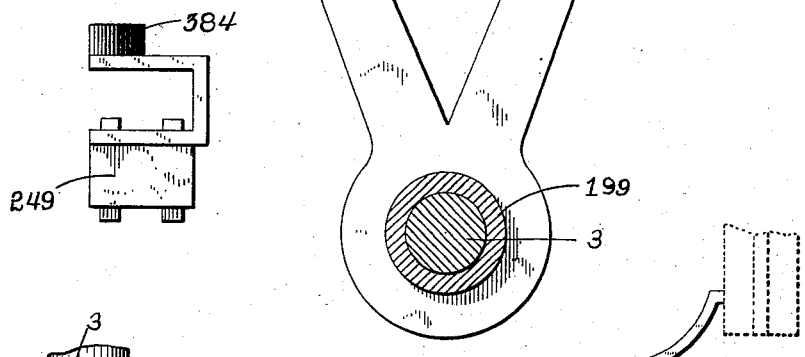
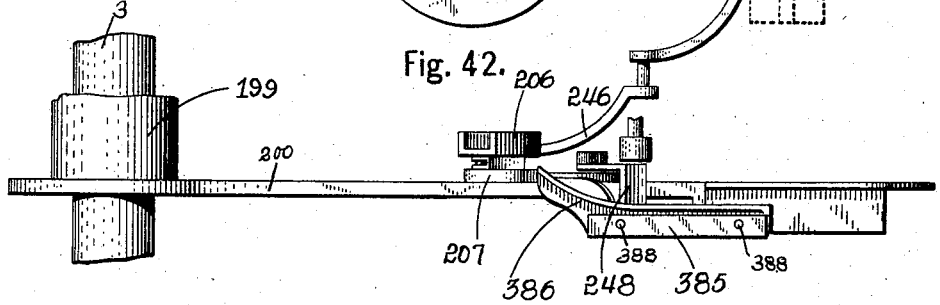
Witnesses.
L. M. Sangster
Geo. A. Neubauer
Inventor.
Jesse A. Field,
By A. J. Sangster
Attorney.

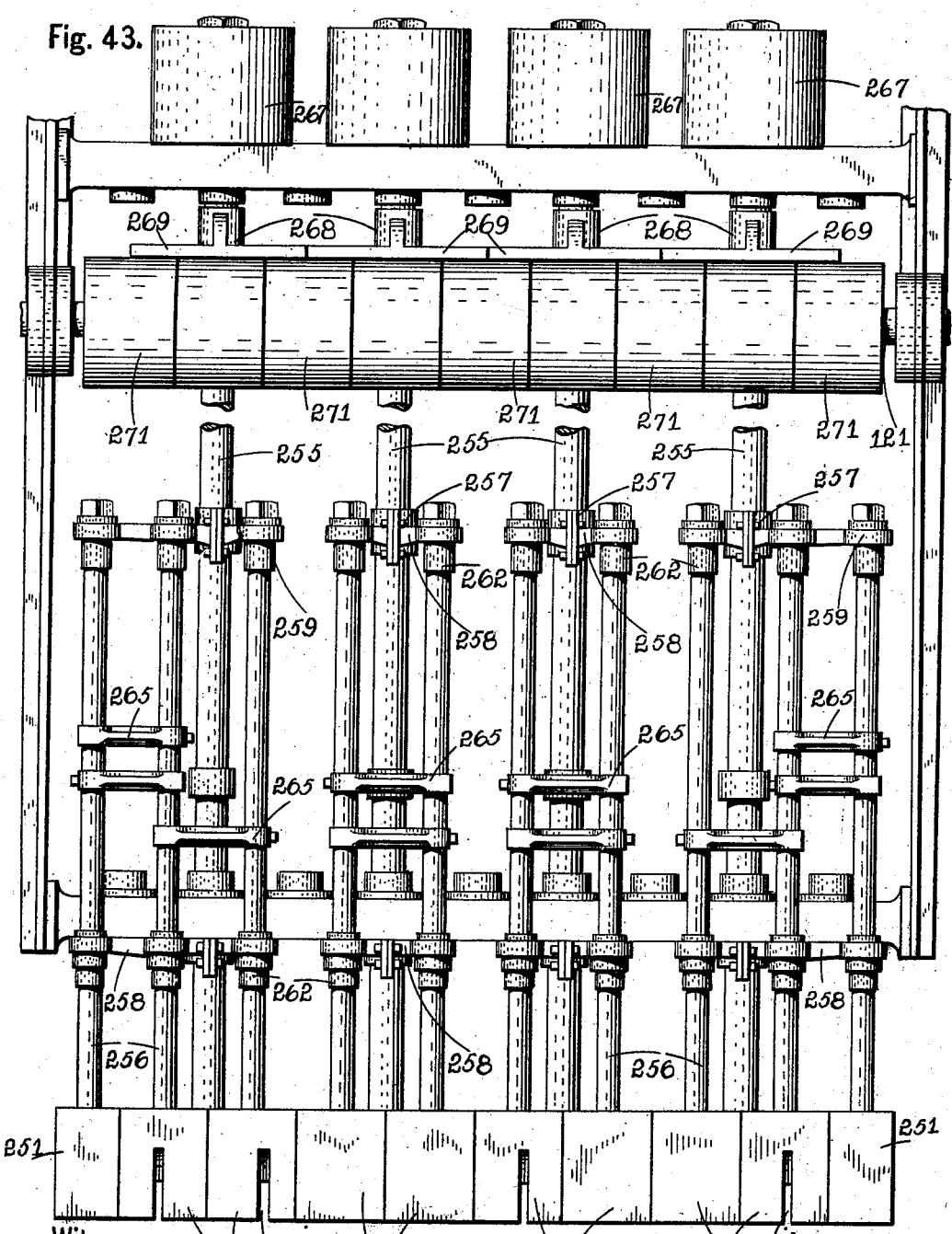

No. 718,442. PATENTED JAN. 13, 1903.
J. A. FIELD.
MOLDING MACHINE.
APPLICATION FILED JULY 20, 1901.
NO MODEL. 27 SHEETS—SHEET 18.
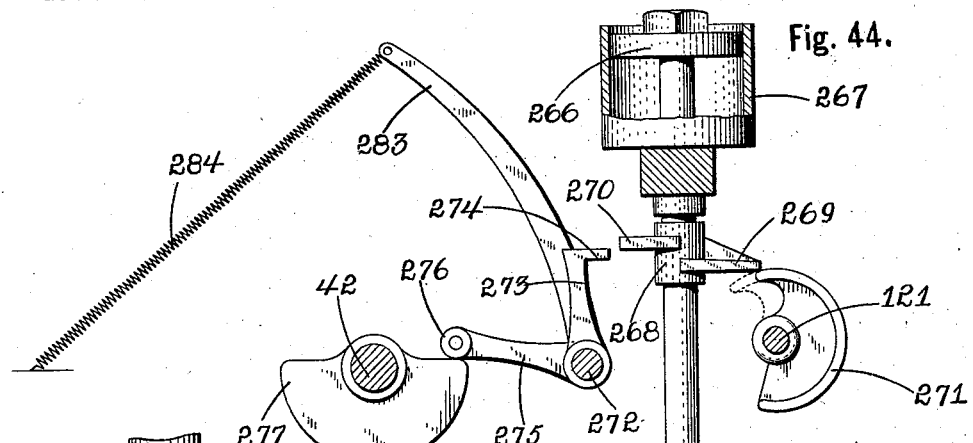
Fig. 44.
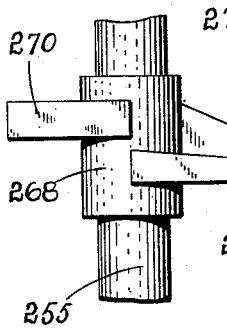
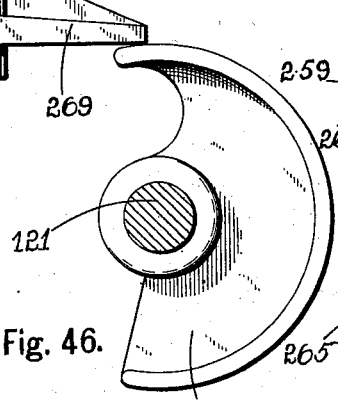
Fig. 45.
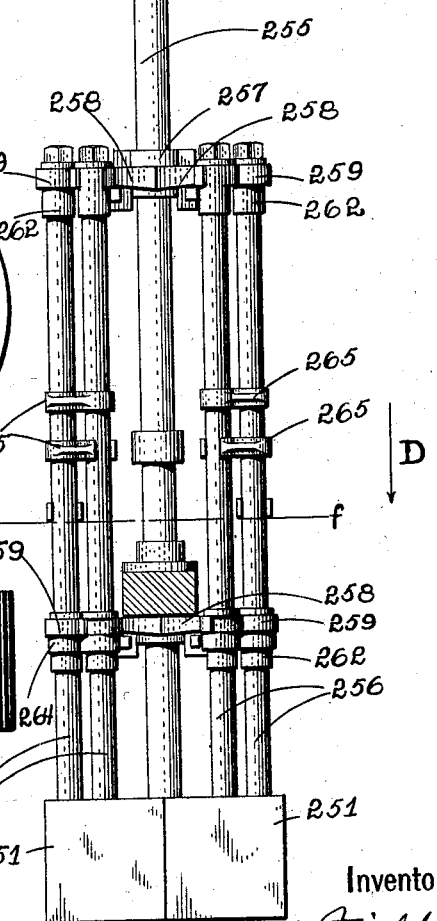
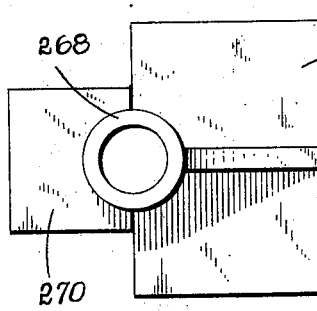
Fig. 46.
Witnesses.
L. M. Sangster.
Geo. A. Neubauer.
Inventor.
Jesse A. Field.
By ............
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 19.
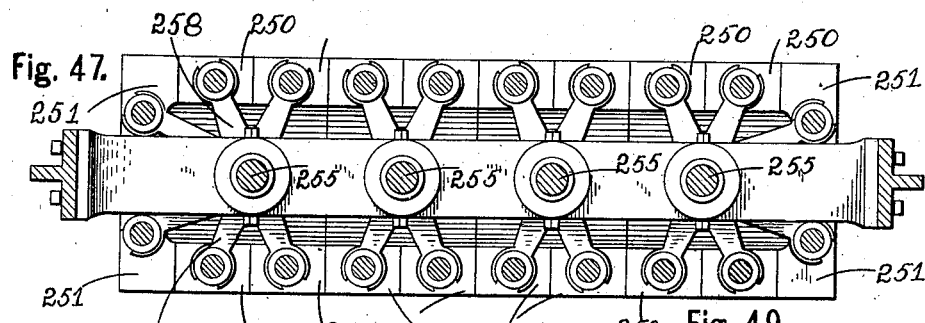
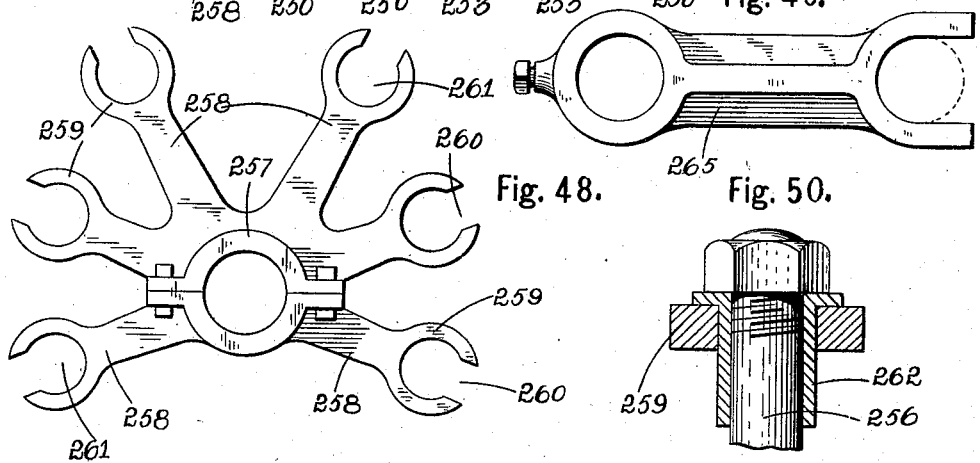
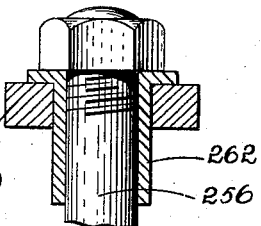
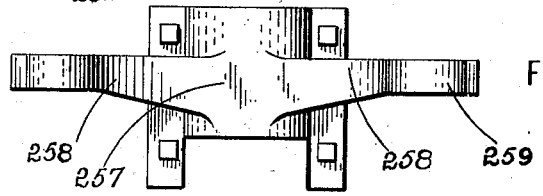
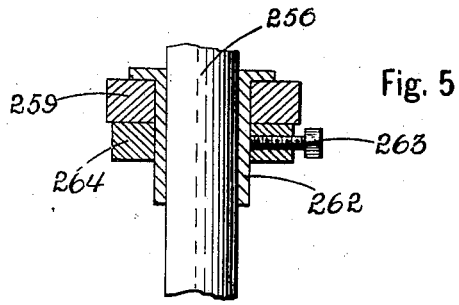
Witnesses. Inventor.
L. M. Sangster Jesse A. Field.
Geo. A. Neubauer By A. J. Sangster
Attorney.

No. 718,442.　　　　　　　　　　　　　　　　　　　PATENTED JAN. 13, 1903.
J. A. FIELD.
MOLDING MACHINE.
APPLICATION FILED JULY 20, 1901.
NO MODEL.　　　　　　　　　　　　　　　　　　　　　27 SHEETS—SHEET 20.
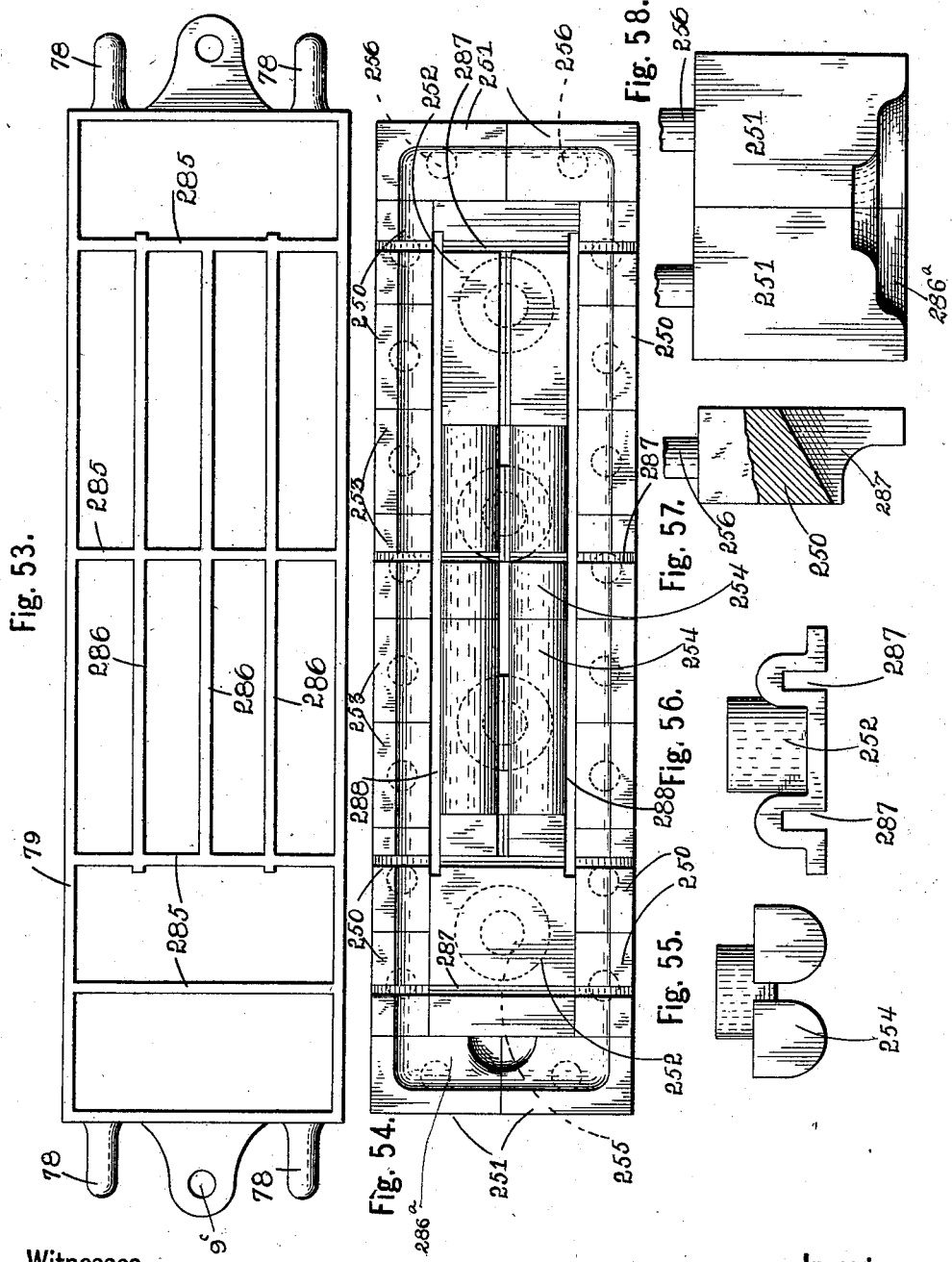
Witnesses.　　　　　　　　　　　　　　　　　　　　　　Inventor.
L. M. Sangster　　　　　　　　　　　　　　　　Jesse A. Field
Geo. A. Neubauer　　　　　　　　　　　　　By A. J. Sangster
　　　　　　　　　　　　　　　　　　　　　　　　　　　　　Attorney.

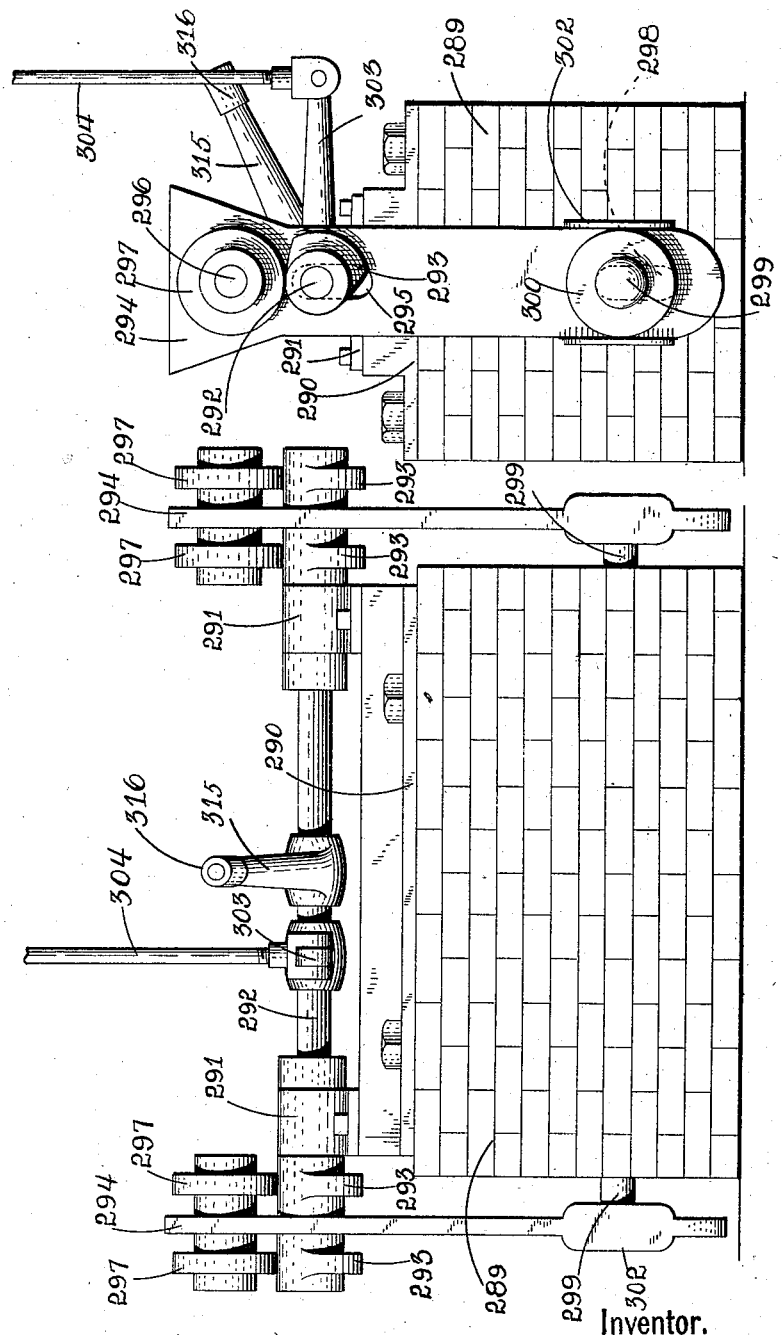

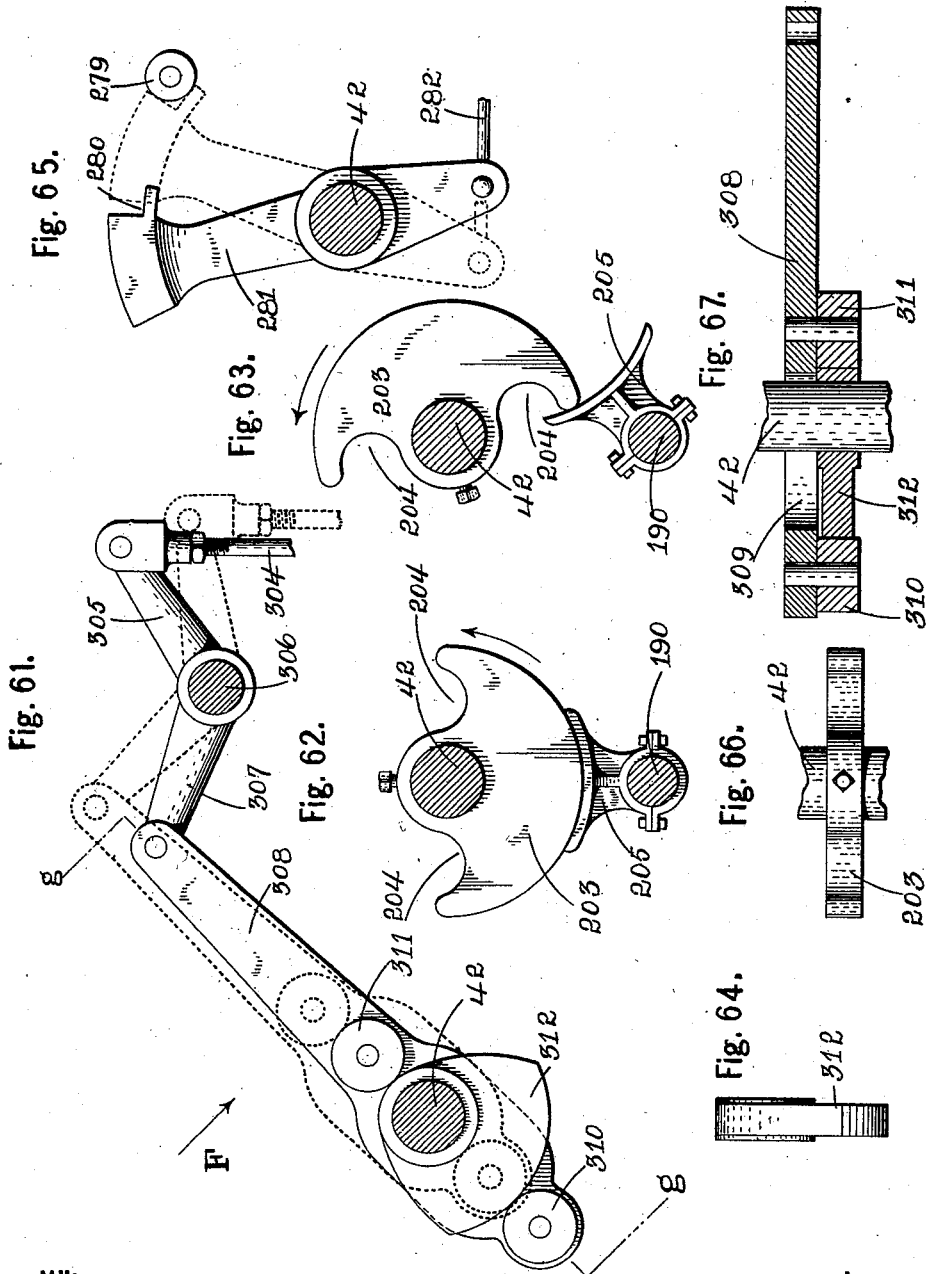

No. 718,442. PATENTED JAN. 13, 1903.
J. A. FIELD.
MOLDING MACHINE.
APPLICATION FILED JULY 20, 1901.
NO MODEL. 27 SHEETS—SHEET 23.

Witnesses. Inventor.
L. M. Sangster Jesse A. Field
Geo. A. Neubauer By A. J. Sangster
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 24.

Witnesses. Inventor.
Jesse A. Field.
By
Attorney.

No. 718,442. PATENTED JAN. 13, 1903.
J. A. FIELD.
MOLDING MACHINE.
APPLICATION FILED JULY 20, 1901.
NO MODEL. 27 SHEETS—SHEET 25.

Witnesses.
L. M. Sangster
Geo. A. Neubauer

Inventor.
Jesse A. Field.
By A. J. Sangster
Attorney.

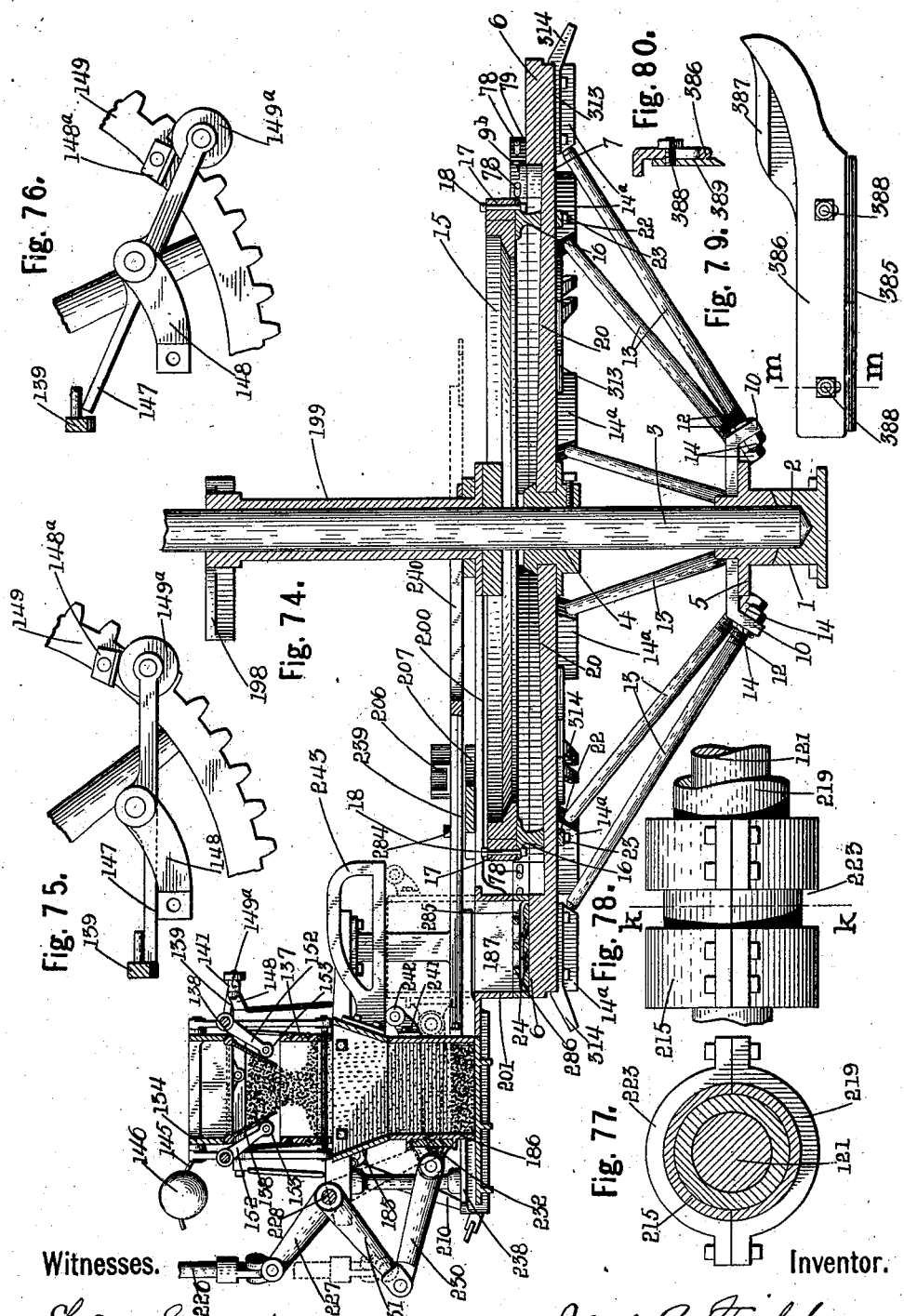

No. 718,442. PATENTED JAN. 13, 1903.
J. A. FIELD.
MOLDING MACHINE.
APPLICATION FILED JULY 20, 1901.
NO MODEL. 27 SHEETS—SHEET 27.
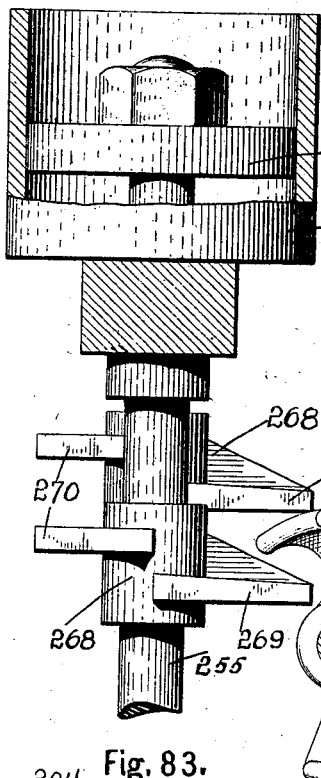
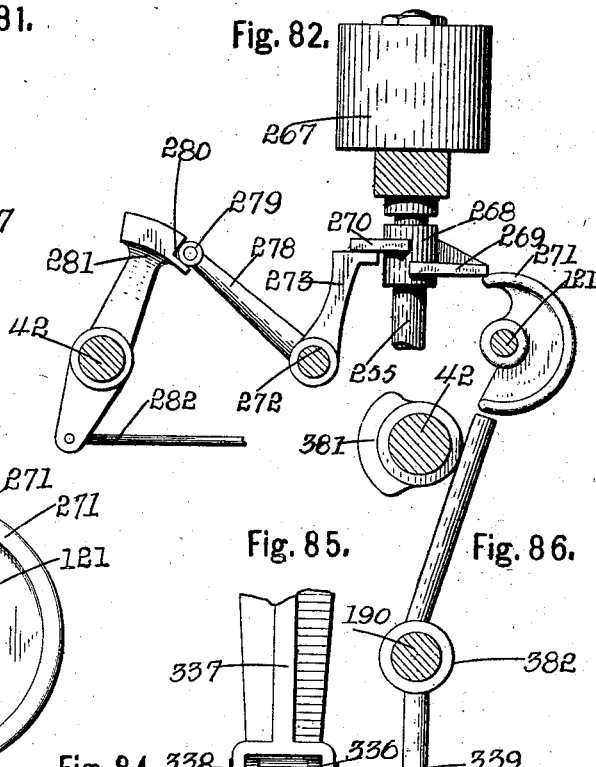
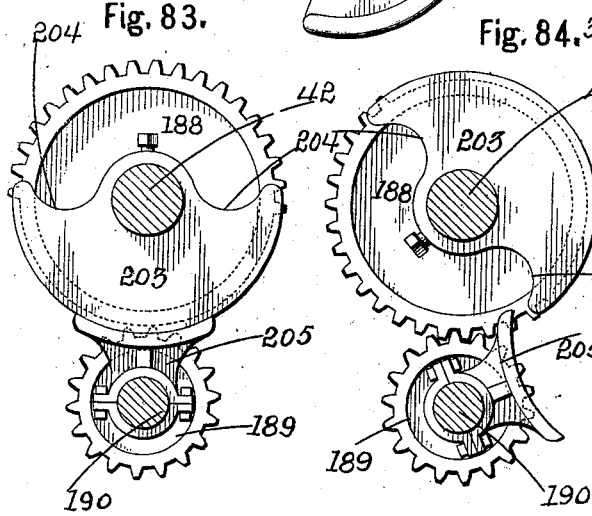
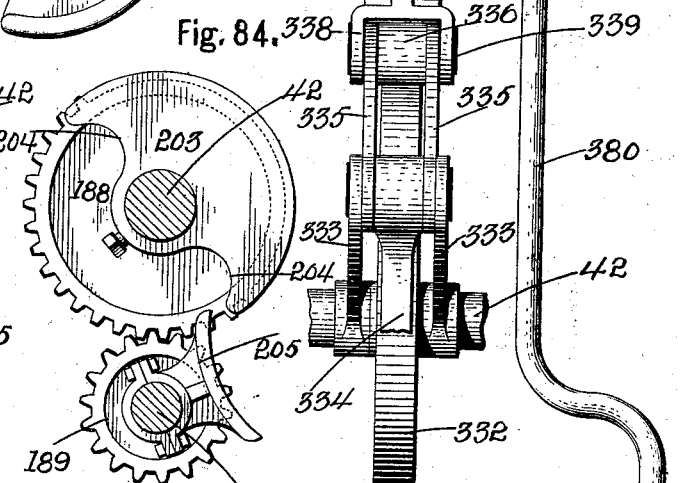
Witnesses.
L. M. Sangster
Geo. A. Neubauer
Inventor.
Jesse A. Field.
By A. J. Sangster
Attorney.

UNITED STATES PATENT OFFICE.

JESSE A. FIELD, OF DUNKIRK, NEW YORK.

MOLDING-MACHINE.

SPECIFICATION forming part of Letters Patent No. 718,442, dated January 13, 1903.

Application filed July 20, 1901. Serial No. 69,030. (No model.)

*To all whom it may concern:*

Be it known that I, JESSE A. FIELD, a citizen of the United States, residing at Dunkirk, in the county of Chautauqua and State of New York, have invented certain new and useful Improvements in Molding-Machines, of which the following is a specification.

My invention relates to an improved molding-machine having an intermittently-moving flask-supporting mechanism and means for filling and ramming the flasks during the intermissions of said supporting mechanism.

Other improvements have reference to automatic mechanism for depositing flasks on and receiving flasks from the supporting mechanism, to the construction of the sand-delivering mechanism, and the construction and operation of the ramming mechanism, all of which will be fully and clearly hereinafter described and claimed, reference being had to the accompanying drawings, in which a preferred adaptation of the machine and its component elements are shown.

This improved machine, briefly stated, consists of an intermittently-rotated flask-supporting table and various mechanisms for performing different operations in making and perfecting molds. These mechanisms are arranged at different points above the flask-supporting table, so that each mechanism can be operated upon a different flask on the table, and in the preferred adaptation of the machine shown and in part include the following: a removing and depositing mechanism for removing the flasks from a stationary support and depositing them on the table, a facing mechanism for covering the pattern with a thin layer of fine material, a sand-conveying and flask-filling mechanism, a false-flask mechanism, a ramming mechanism, mechanism for holding the table and flask rigid during the operation of the ramming mechanism, and mechanism for moving the finished flasks from the table and depositing them on a stationary support.

The invention, however, is not to be considered as limited to the mechanisms above stated, as their order of operation upon flasks might be varied and some of the mechanisms might be omitted without materially injuring the successful operation of the machine except to decrease its capacity—as, for instance, the flasks might be deposited on or removed from the table by hand, thereby dispensing with the power-driven depositing and removing mechanism.

All of the above mechanisms are operated from the machine, being connected either to the main shaft, the driving-shaft, or one or more of the other shafts of the machine.

Figure 2:
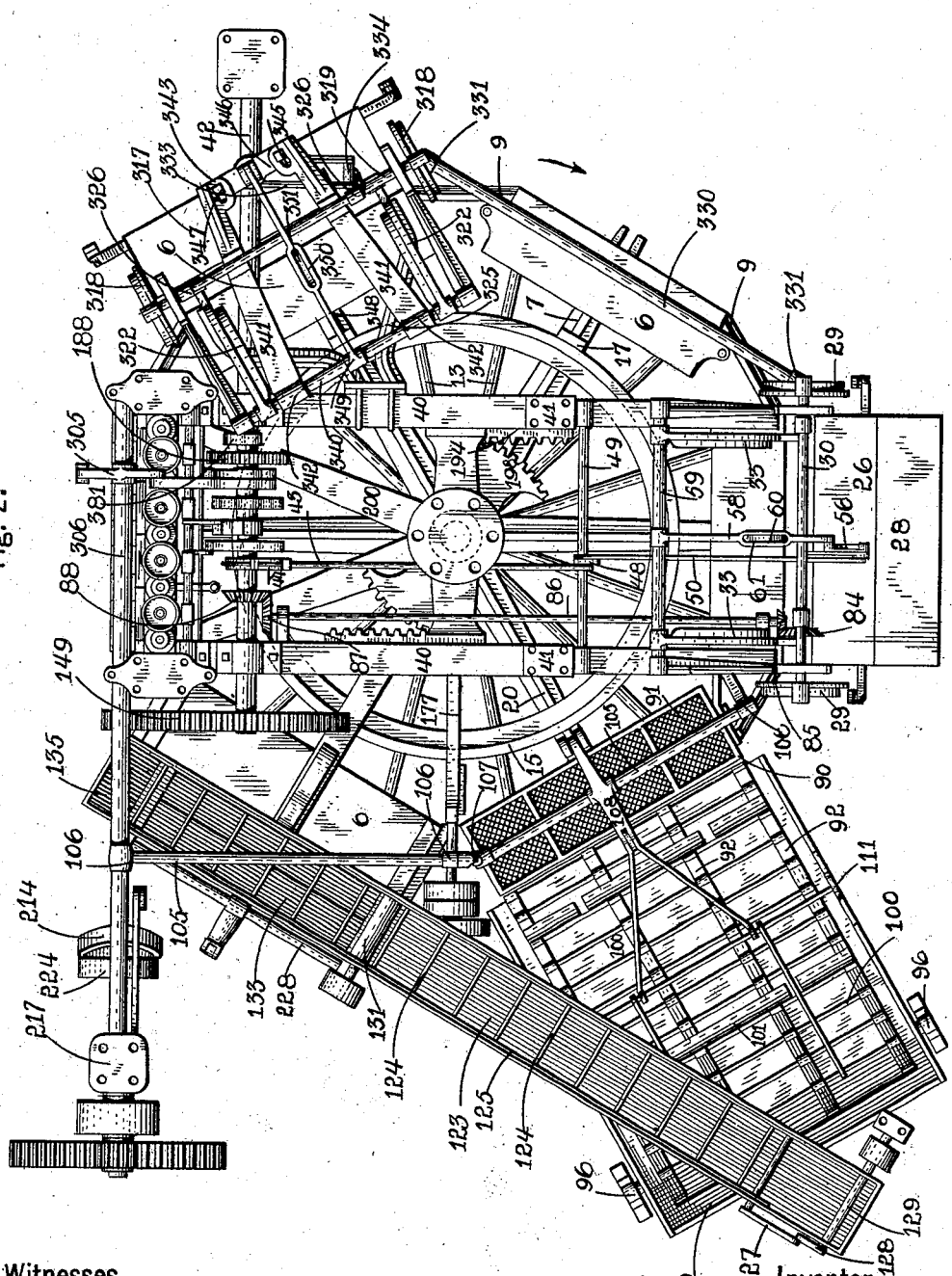
Figure 3:
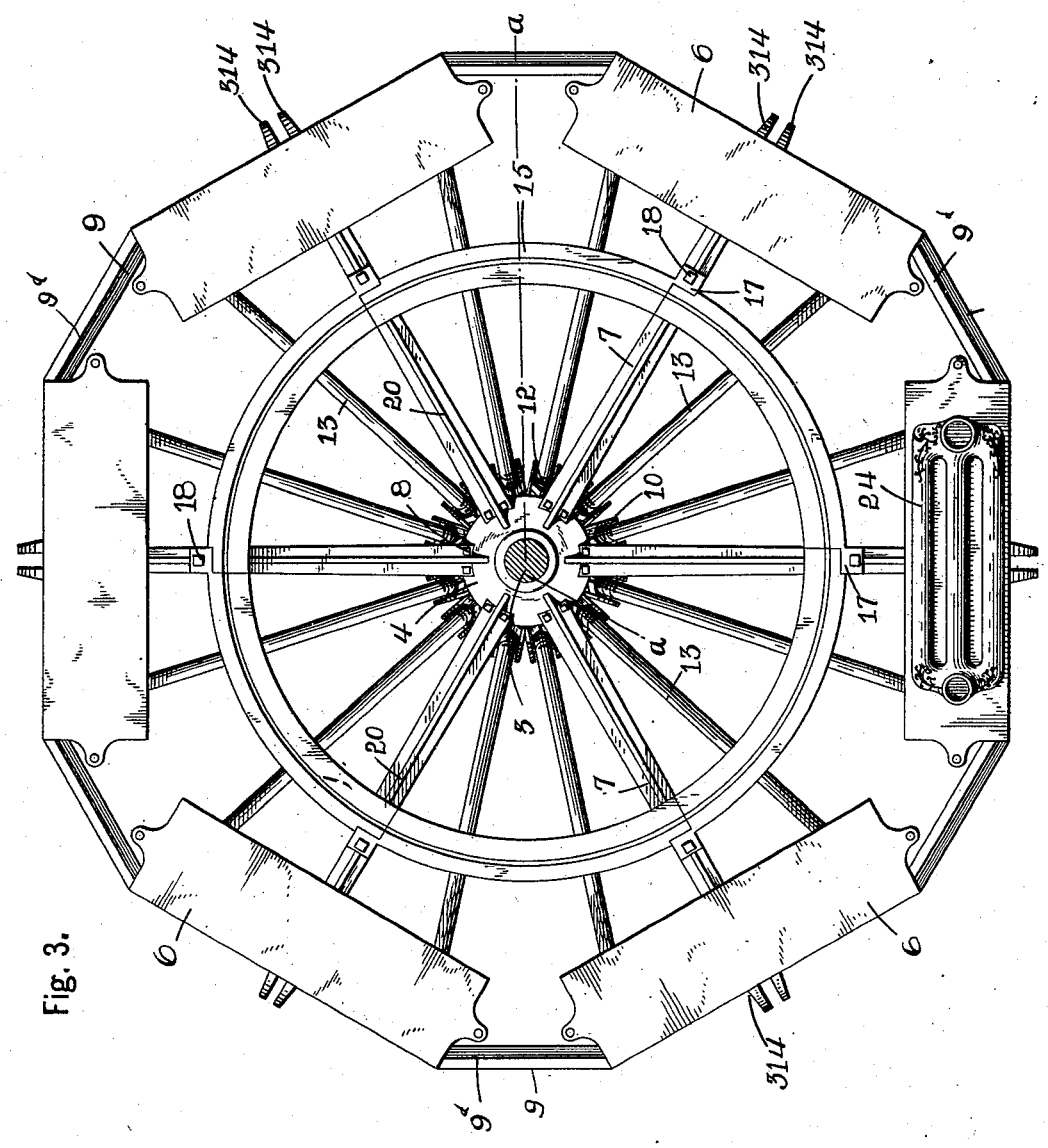
Figures 15, 16, 17:
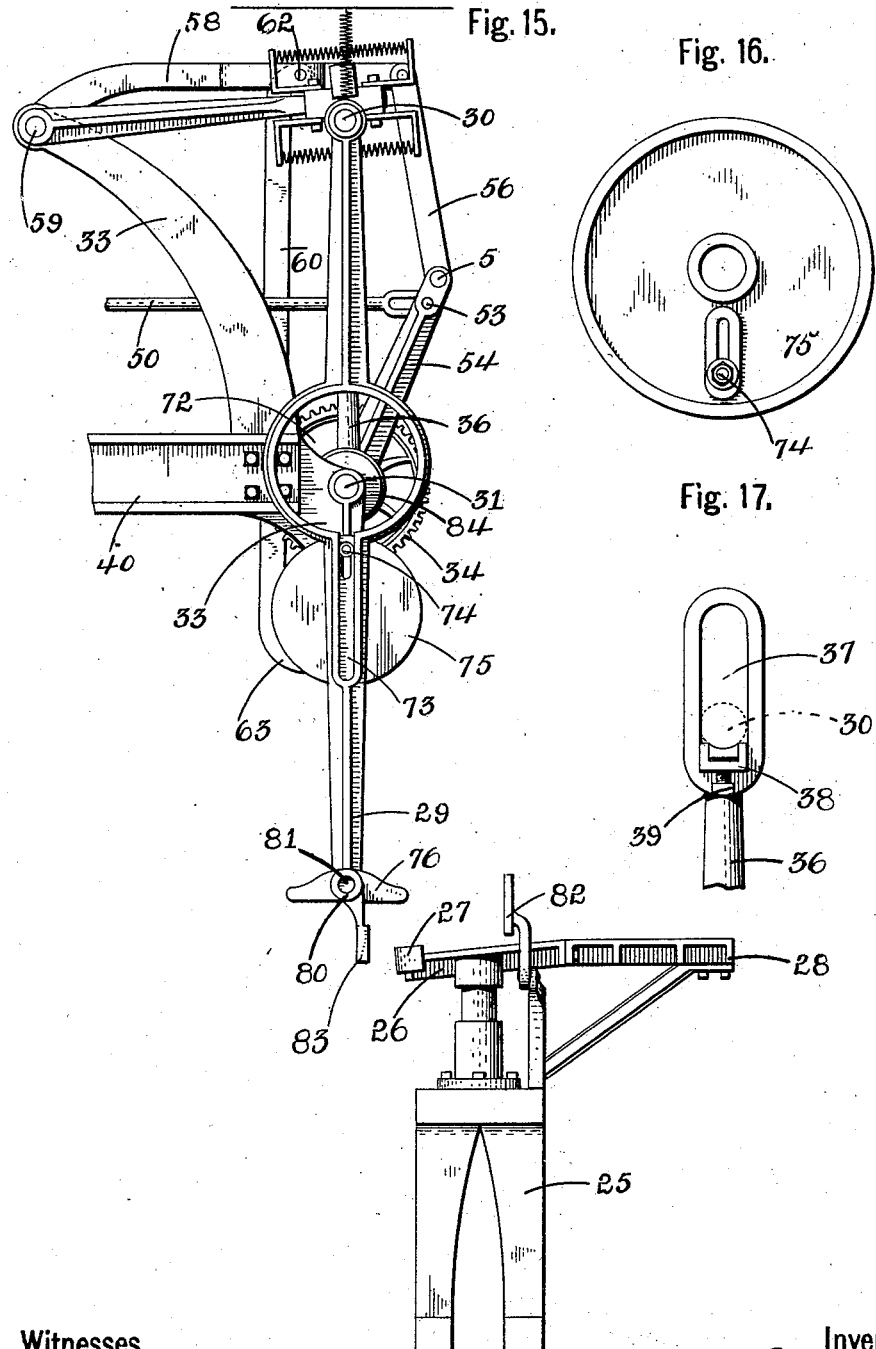
Figure 39:
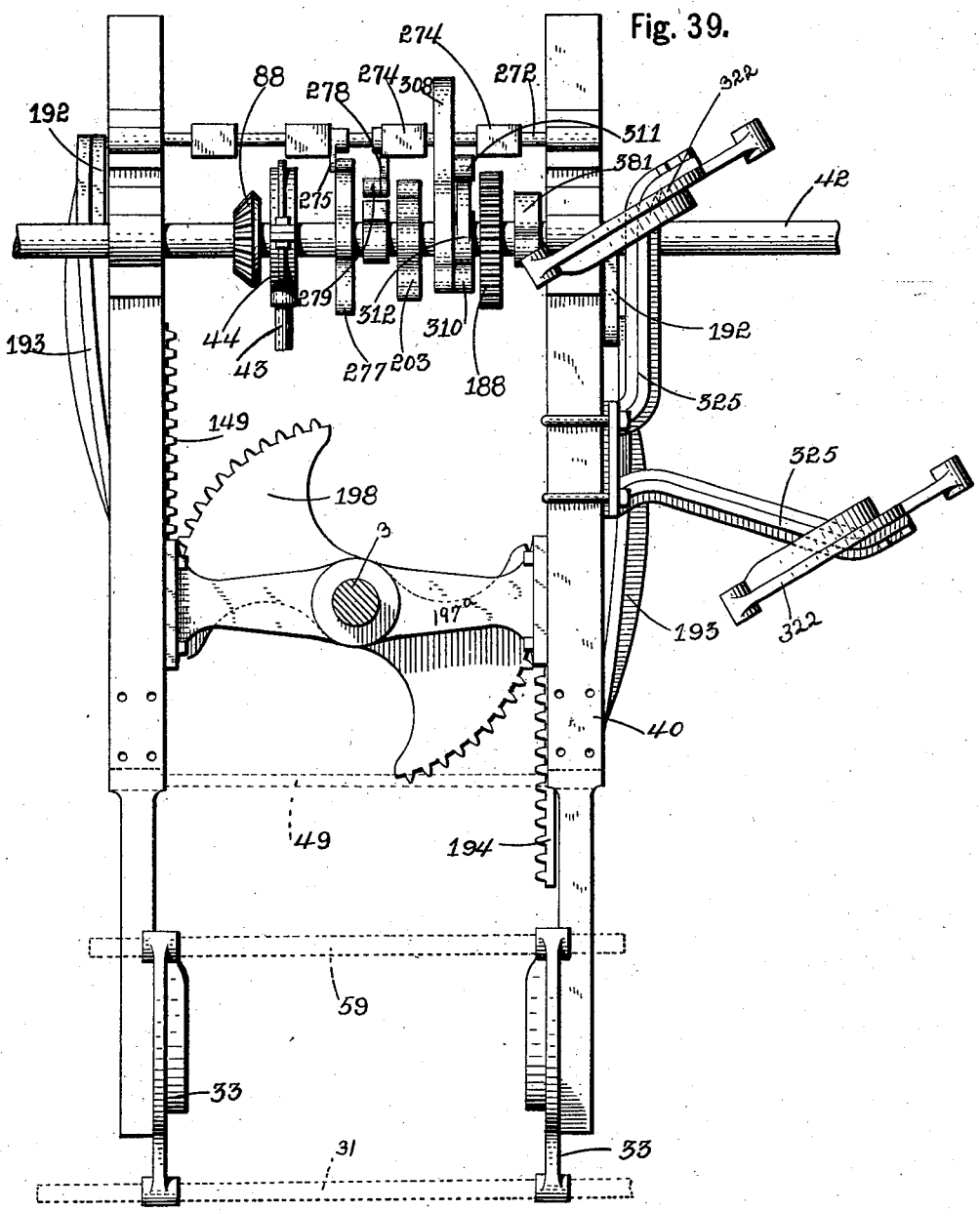
Figure 68:
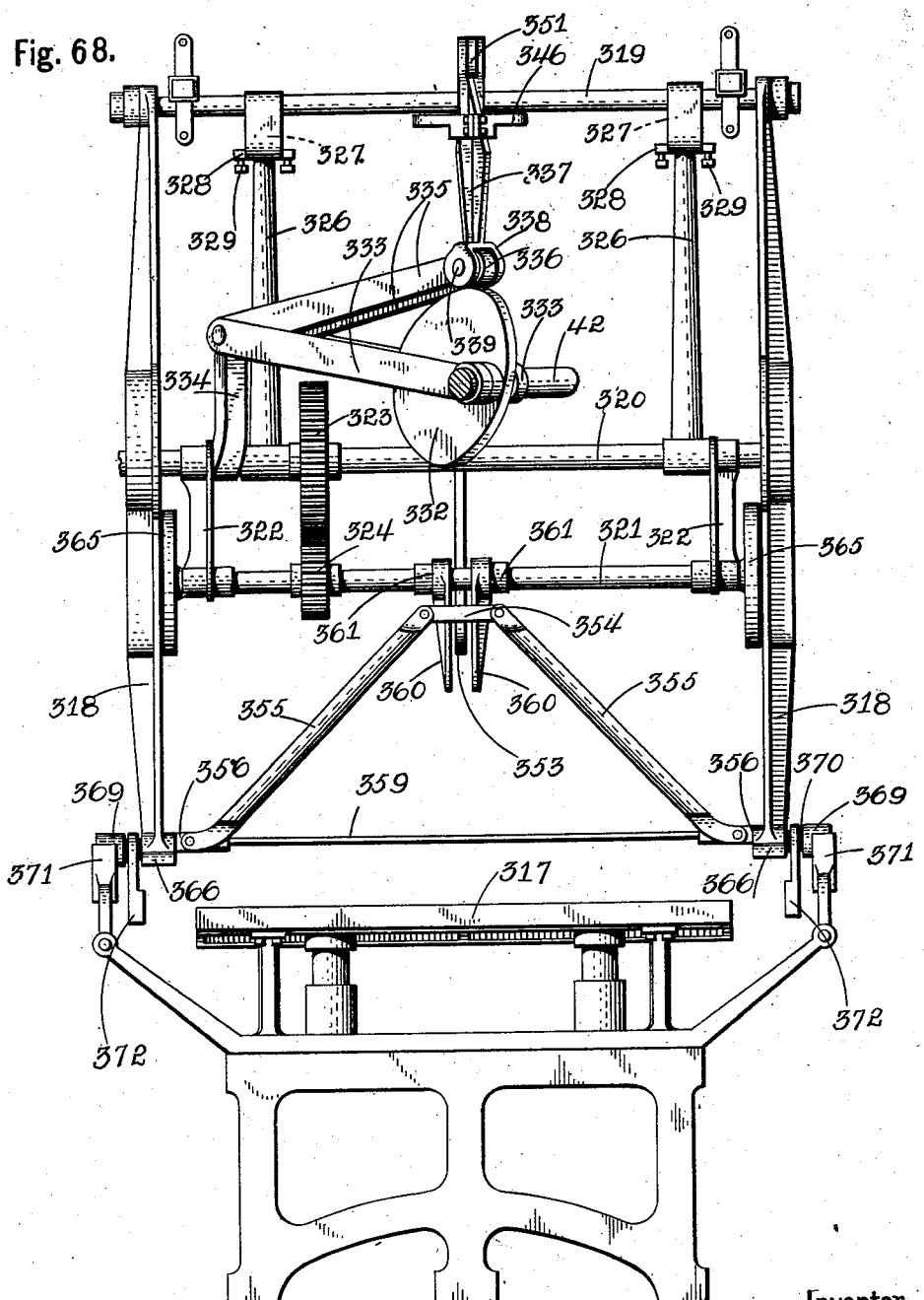
Figure 69:
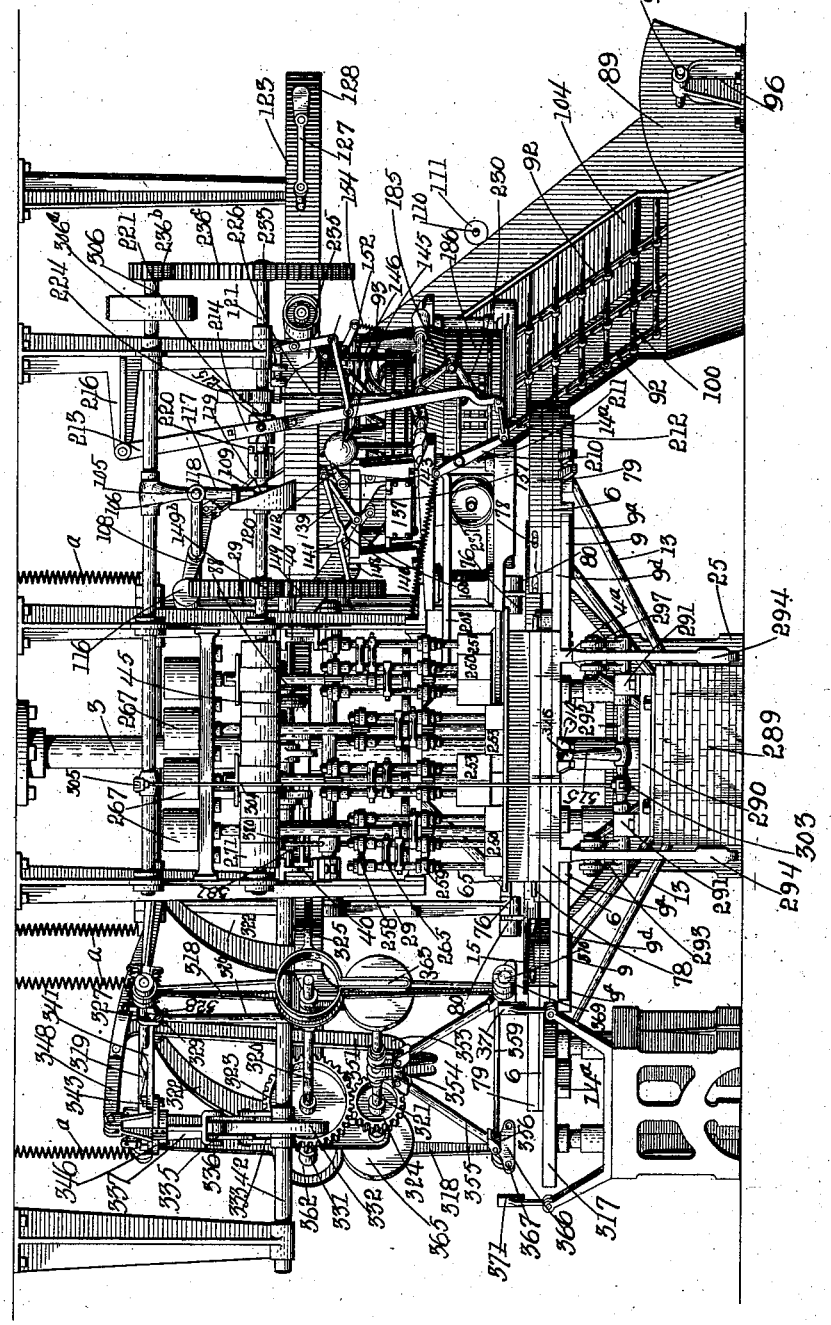
Figure 70:
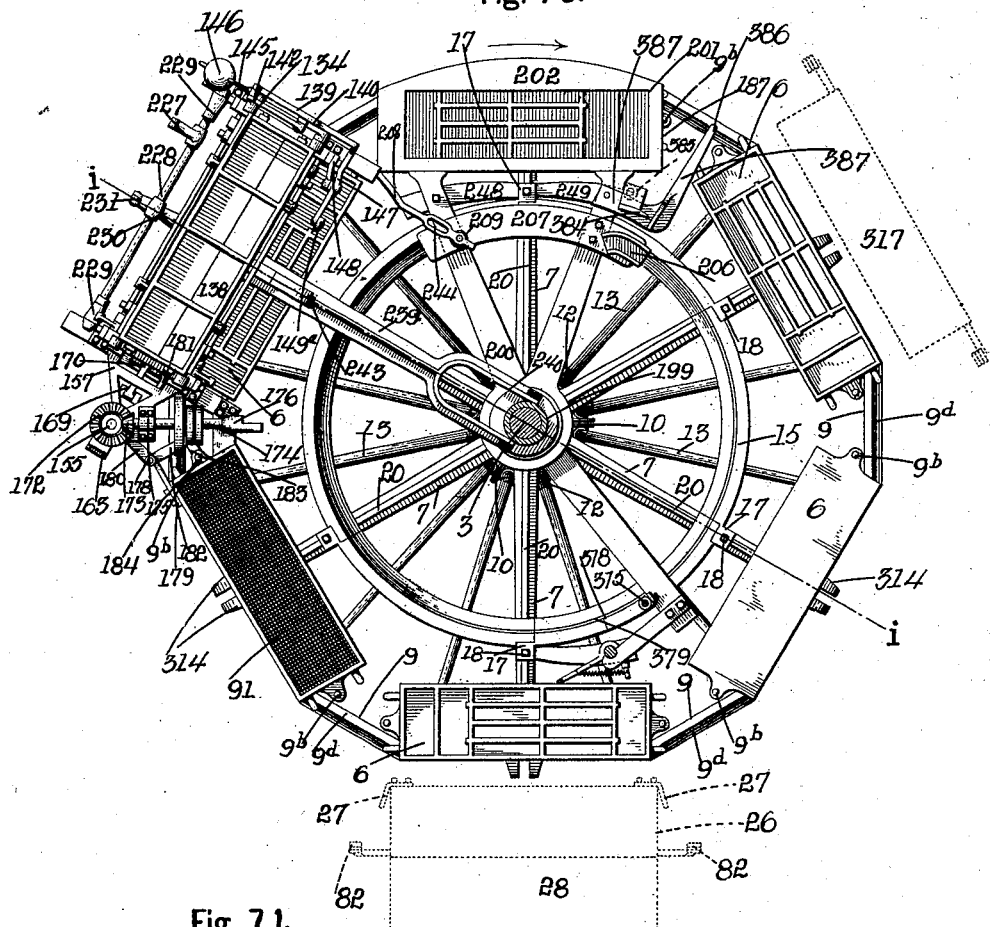
Figure 71:
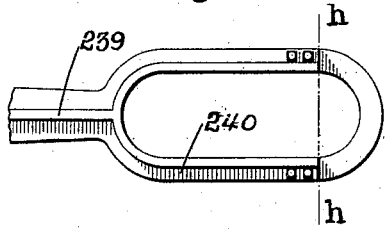
Figure 72:
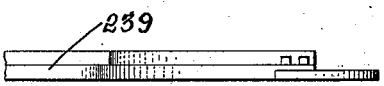
Figure 73:
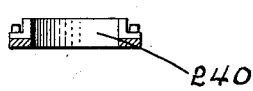

Figure 1 is a front elevation of the complete machine. Fig. 2 is a plan view of the same. Fig. 3 is a top plan view of the flask-supporting table, showing a pattern in position upon one of its plates. Fig. 4 is an enlarged fragmentary section through the table and its supporting-hubs on or about line *a a*, Fig. 3, with the base partially in section and showing the lower end of the vertical shaft in the base in dotted lines. Fig. 5 is an enlarged side view of the ring-supporting blocks, showing the manner of supporting the annular ring and also showing a fragment of one of the radial beams. Fig. 6 is an end view of the supporting-block shown in Fig. 5 looking in the direction of the arrow A, also showing a fragment of the annular ring. Fig. 7 is a horizontal section through the block on or about line *b b* looking in the direction of the arrow B, Fig. 6, and also showing a fragment of one of the radial beams. Fig. 8 is an enlarged fragmentary top plan view of the lower hub of the central vertical shaft, also showing a transverse section through the shaft. Fig. 9 is a section on or about line *c c*, Fig. 8. Fig. 10 is an enlarged detached bottom plan view of a section of the flask-supporting table. Fig. 11 is an edge view of the table-section shown in Fig. 10. Fig. 12 is an end view of one of the stop-plates. Fig. 13 is a top plan view of one of the bars for connecting the flask-supporting plates. Fig. 14 is an enlarged detached front elevation of the flask lifting and gripping mechanism, also showing the stationary table or support. Fig. 15 is a side elevation of the mechanism shown in Fig. 14 looking in the direction of the arrow V. Fig. 16 is an enlarged view of one of the disks for swinging the lifting-arms, also showing its adjustable crank-pin. Fig. 17 is an enlarged fragmentary side view of the upper slotted end of one of the shaft-supporting bars, showing the manner of regulating the movement of the upper shaft, the shaft being shown in dotted lines. Fig. 18 is an enlarged detached side view looking in a direction opposite to the arrow V, Fig. 14, of the knuckle-joint, the lifting-hook, eccentric, and its connecting-rods, with a section through the eccentric supporting-shaft. Fig. 19 is an inside view of the lower end of one of the lifting-arms, showing the stop for limiting the inward movement and also the means for gripping the flask. Fig. 20 is an enlarged top plan view of a fragment of the stationary support, showing one of the stops for limiting the inward movement of the flask. Fig. 21 is an enlarged side view of a fragment of one of the lifting-arms, showing the operation of the disk and its crank-pin in full lines and dotted lines. Fig. 22 is an enlarged detached side view of one of the stop-blocks for limiting the outward movement of the lifting-arms. Fig. 23 is an enlarged fragmentary section through a portion of the lower end of one of the lifting devices and connection to show the method of limiting the gripping movement of the same. Fig. 24 is an enlarged section through the bin containing the facing material, also showing a front view of the facing-elevating mechanism. Fig. 25 is an end view of the cam and mechanism for operating the facing-elevating device. Fig. 26 is a section on or about line $dd$, Fig. 24. Fig. 27 is an enlarged detached top plan view of one of the facing-carrying buckets. Fig. 28 is a side view of the cam and mechanism shown in Fig. 25. Fig. 29 is an enlarged detached top plan view of the facing-sieve. Fig. 30 is an enlarged top plan view of a fragment of the machine, showing the sand-box, the sifting-sieve and its operating mechanism, the shifting shell and its operating mechanism, and a fragment of the facing-sieve, also showing the gear-wheels in dotted lines which operate the tripping-lever for releasing the sand-box bottom. Fig. 31 is an enlarged detached end view of the sand-box and shifting-shell mechanism looking in the direction of the arrow C, Fig. 30. Fig. 32 is an enlarged fragmentary view of the eccentric locking mechanism. Fig. 33 is a transverse section through the movable member of the clutch mechanism and its supporting-shaft. Fig. 34 is a front view of the sand-box and mechanism shown in Fig. 30, also showing a longitudinal section through the sand-trough. Fig. 35 is an enlarged side view of the sifting-sieve-agitating device. Fig. 36 is a horizontal section on line $ee$, Fig. 35. Fig. 37 is an enlarged fragmentary side elevation of the bed-pieces of frame, showing a portion of the operating mechanism, also showing a diagrammatic view of the flask-lifting mechanism illustrated in Fig. 18, in dotted lines, to show its position relatively to the frame. Fig. 38 is an enlarged detached top plan view of one of the rack-bars and connecting-rods. Fig. 39 is an enlarged top plan view of the bed-pieces, showing cams and gears mounted on the main shaft and also the hammer-locking devices. Fig. 40 is an enlarged detached top plan view of the false-flask mechanism. Fig. 41 is an enlarged detached end view of one of the stop-bars. Fig. 42 is a side elevation of the false-flask mechanism looking in the direction of the arrow E, Fig. 40, also showing a fragment of the central vertical supporting-shaft. Fig. 43 is an enlarged detached side view of the sand-ramming mechanism. Fig. 44 is an enlarged detached end view of the hammers, their supports, and operating mechanism, also showing a section through one of the air-cushioning devices and also the mechanism for lifting and dropping the hammers and locking the same in elevated position. Fig. 45 is an enlarged detached side view of one of the hammer-operating cams, with a section through its shaft, also showing the collar, having a lug engaging the cam, and a fragment of the collar-supporting shaft. Fig. 46 is a top plan view of the mechanism shown in Fig. 45. Fig. 47 is a horizontal section on or about line $ff$, Fig. 44, looking in the direction of the arrow D. Fig. 48 is a top plan view of one of the collars for supporting the short shafts from the long central shaft. Fig. 49 is an enlarged top plan view of one of the hammer-shaft guides. Fig. 50 is a section through one of the arms of the upper shaft-supporting collars with a fragment of the short shaft in place, showing the manner of supporting the shaft. Fig. 51 is a side elevation of the collar shown in Fig. 48. Fig. 52 is a section through one of the arms of the lower shaft-supporting collar, also showing a fragment of its supporting-shaft. Fig. 53 is a top plan view of the improved flask preferably used in this improved machine. Fig. 54 is an enlarged detached bottom plan view of the hammers. Fig. 55 is an end view of one of the interior hammers of one of the intermediate groups. Fig. 56 is an end view of one of the interior hammers of one of the end groups. Fig. 57 is an enlarged detached view of one of the side hammers, part being cut away to show the inclined bottom edge of the slot. Fig. 58 is an enlarged detached view of two of the exterior hammers of an end group looking toward their inner edge. Fig. 59 is an enlarged side view of the mechanism for supporting one of the flask-supporting tables while a flask is being rammed, also showing the mechanism for stopping the table. Fig. 60 is an end view of the table-supporting mechanism shown in Fig. 59. Fig. 61 is a side view of the mechanism for operating the table-supporting mechanism shown in Fig. 59, a section being cut through the supporting-shafts, the mechanism shown in one position in full lines and in another position in dotted lines. Fig. 62 is a side elevation of the cam mechanism for preventing the lower shaft from rotating, showing the lower shaft held in inoperative position, also showing sections through the supporting-shafts for the cams. Fig. 63 is a view similar to Fig. 62, showing the lower shaft just beginning its revolution. Fig. 64 is an end view of the cam which operates the flask-supporting-table stop. Fig. 65 is a side elevation of the cam for locking the hammers permanently in inoperative position. Fig. 66 is a top plan view of the cam shown in Figs. 62 and 63, also showing a fragment of its supporting-shaft. Fig. 67 is a section on or about line $g$ $g$, Fig. 61, looking in the direction of the arrow F. Fig. 68 is an enlarged front view of the mechanism for lifting the completed flask from the flask-supporting table. Fig. 69 is a rear elevation of the machine. Fig. 70 is a top plan view of the table, the facing-sieve, the sand-box and its agitating mechanism, and the false flask, the other parts being omitted, a horizontal section being taken through the central vertical shaft and the stationary flask-supports being shown in dotted lines. Fig. 71 is an enlarged detached view of the enlarged longitudinally-slotted end of the guide-bar for the shifting shell. Fig. 72 is an edge view of the enlarged guide-bar end shown in Fig. 71. Fig. 73 is a section on line $h$ $h$, Fig. 71. Fig. 74 is a fragmentary vertical central section on line $i$ $i$, Fig. 70. Fig. 75 is an enlarged fragmentary view of a gear-wheel and the lever adapted to be tripped by a side lug on said gear-wheel. Fig. 76 is an enlarged fragmentary view of the parts shown in Fig. 75, showing the lever after it is tripped. Fig. 77 is a section on line $k$ $k$, Fig. 78. Fig. 78 is a side elevation of the movable member of the clutch device with a fragment of the supporting-shaft and sleeve. Fig. 79 is an enlarged detached side view of the scraper. Fig. 80 is a vertical section on line $m$ $m$, Fig. 79. Fig. 81 is an enlarged fragmentary section of the upper portion of the hammers, portions being broken away to show the interior construction of the air-cushion device, also showing two of the operating-cams and a section through their supporting-shaft. Fig. 82 is an enlarged fragmentary view of the upper part of the hammers and the mechanism for raising the same and temporarily locking the same in elevated position, also showing the mechanism for permanently locking the hammers in their elevated position. Figs. 83 and 84 are enlarged views of the mutilated gear-wheel and the gear-wheel meshing therewith, together with the concave block, to illustrate the operation of the mutilated gear-wheel. Fig. 85 is an enlarged fragmentary side view of the system of cam-levers for operating the second lifting mechanism. Fig. 86 is an enlarged detached view of the cam and operating-rod for unlocking the false flask.

Referring to the preferred adaptation of the machine shown in the drawings for the details of construction, like characters designate like parts.

In describing this machine I will first describe the flask-supporting mechanism and then take up part by part in consecutive order the various mechanisms required to perform the several operations, explaining their construction and the manner in which they operate.

*The machine-frame.*—The frame of the machine, which supports the operating parts, can be arranged in a variety of ways, according to the location in which it is to be placed. In the adaptation illustrated it is partially supported from the ceiling and partially from the floor of the room in which it is placed.

A series of coil-springs $a$, suspended from the ceiling, are connected to the machine-frame at various points and serve to yieldingly support the frame, at least in part. A series of hangers $b$ may also be employed to support portions of the frame or parts of the operating mechanism. In fact, it is obvious that the machine may be entirely supported on the frame or hung from the ceiling, if desired.

The base 1 has a depression (shown in dotted lines at 2 in Fig. 4) in which the lower end of a vertical shaft 3 is journaled. Upper and lower collars or hubs 4 and 5 are mounted on this shaft and form upper and lower central supporting portions of the flask-supporting mechanism, of which they are a part.

*The flask-supporting table.*—The flask-supporting table is composed of a plurality of flask-supporting plates 6, which are arranged at equal intervals around the upper hub 4 and are connected to said hub by beams 7, cast integral with the plates 6 and bolted at their inner ends to the upper hub 4, as shown in Fig. 3. The plates are connected to each other by the braces or beams 9, which are bolted to the plates by the bolts $9^a$, as shown in Fig. 11. Two vertical pins $9^b$ are mounted one near each end of each plate, which are adapted to pass through openings $9^c$ in the end lugs of the flasks to hold the flasks in position on the plates. The braces or beams 9 are beveled at $9^d$ for a purpose to be hereinafter explained. The table is also braced or supported from the lower hub 4 by means of adjustable rods, the lower hub having a series of angular channeled supports 10, fastened thereto by bolts 11, to which the lower screw-threaded end 12 of the rods 13 are adjustably secured by the nuts 14. The upper ends of the rods 13 are of a cone formation and seat in depressions in the beveled end surfaces of integral enlargements $14^a$ of the flask-supporting plates, as shown in Figs. 4 and 10. A circular ring 15 is mounted on supporting-blocks 16, fastened to the beam 7. This ring is composed of a plurality of segments, substantially as shown in Fig. 4, and each segment has a projecting portion 17, which extends beyond the abutting end of an adjacent segment and fits upon the top surface of one of the supporting-blocks, being secured in place by a bolt 18. Each block 16 has a bottom slot, the position of which is indicated in Fig. 7 by the numeral 19, and a line extending therefrom to the margin of the slot as the central vertical rib 20, of one of the beams 7, is fitted therein. Each block also has two oppositely-extending lugs 21, which project beyond the edge of the beam. In securing the block to a beam a flat metal piece 22 is placed beneath the beam and bolts 23 are passed through holes in the oppositely-projecting lugs 21 and the metal piece. The patterns 24 are preferably fastened upon the flask-supporting plates, substantially as shown in Fig. 3.

The flask-supporting table is rotated intermittently by mechanism to be hereinafter described.

*Flask-depositing mechanism.*—Automatic mechanism is provided for lifting the flasks from a stationary support and depositing them upon the table during one of its stationary intervals. This mechanism is automatically operated from the machine during the intermission of the rotation of the table and is preferably arranged as follows, reference being had to Figs. 14, 15, 16, 17, 18, 19, 20, 21, 22 and 23: A support 25 is mounted outside of the path of travel of the flask-supporting table and has an inner inclined table 26, upon which flask-stops 27 are placed, so that the flask can be properly located upon said table, as shown in Fig. 20. A platform 28 is arranged adjacent to the inclined table 26, which forms a preliminary support for the flask. A pair of lifting-arms 29 are pivoted at their upper ends to a horizontal shaft 30 and are sufficiently loose on said shaft to permit their lower ends to have a slight movement toward and from each other for attachment to and detachment from a flask and an elevating-and-lowering and inward-and-outward movement for lifting and depositing a flask. The upper horizontal shaft 30 is supported so as to have a vertical movement and also a slight lateral movement under spring tension as the lifting-arms operate. (See Figs. 14 and 15.) Two shafts 31 and 32 are journaled in bearings in angular frame-bars 33 and are connected by meshing gear-wheels 34 and 35. (See Fig. 14.) Two rods 36 have their lower ends journaled on the intermediate shaft 31 and their upper ends provided with elongated vertical slots 37, (see Figs. 14 and 17,) through which the shaft 30 passes. The length of the opening in each rod is regulated by a block 38, having a concaved upper surface fitting the shaft 30, which is adjusted vertically by set-screws 39. By this means the vertical movement of the shaft 30 is limited. The upper portions or bed-pieces 40 are secured to the ceiling by vertical standards 41 and form the top members of the machine-frame. The main shaft 42 is journaled in these bed-pieces, substantially as shown in Fig. 37, and extend horizontally across the machine, as shown in Fig. 2, being driven from the driving-shaft, as will be more specifically set forth farther on. A connecting-rod 43 has a collar 44 at one end encircling a cam or eccentric 45, mounted on the main shaft 42. (See Fig. 18.) The opposite end of the rod has a longitudinal slot 46, in which a pin 47, projecting from a rock-arm 48, fits and travels. The rock-arm is mounted on a rock-shaft 49, which is journaled in the bed-pieces. A connecting-rod 50 has a flattened perforated end 51, which is fitted upon a pin 52, extending from the rock-arm 48. The opposite end of the connecting-rod 50 is slotted longitudinally, and a pin 53, connected to one member of the knuckle-joint device, fits and slides in said slot. The knuckle-joint is composed of a lower member 54, having a bifurcated or forked lower end 55, which straddles the intermediate shaft 31, and an upper member 56, the lower end of which is pivoted to the upper end of the lower member by a pivot-pin 57. The upper end of the upper member is pivoted to one end of a slotted bar 58, the opposite end of which is hung on a fixed shaft 59, journaled in the upper end of the angular frame-bars 33. The upper end of an angular bar 60 is pivoted in the slot 61 in the slotted bar 58 by a pivot-pin 62, and its lower end is bent or curved upon itself to form a hook 63, which extends beneath and partially around the lower shaft 32. A transverse horizontal cross-bar 64 is formed integral with the lower end of the angular bar 60. (See Fig. 14.) Two connecting-rods 65 are respectively pivoted at their upper ends to the opposite ends of this transverse cross-bar. These connecting-rods extend diagonally downward and outward and are pivoted at their lower ends to lugs 66, extending from the lower ends of the lifting-arms 29. The lifting-arms are connected together at their lower ends, so as to limit the movement toward each other, the lugs 66 being provided with deep depressions 67, in which the ends of a rod 68 fit and slide. A pipe or tube 69 surrounds the rod 68 and extends between the lugs 66, the ends of the tube or pipe being adapted to contact with the lugs to limit the closing movement of the arms 29. (See Fig. 23.) The lower hooked end 63 of the angular bar 60 is retained in its central position by means of the short arms or stops 70, which are hung loosely from the shaft 32 on opposite sides of the hooked end. These short arms or stops 70 are locked against outward longitudinal movement on the shaft by the collars 71. Both of the lifting-arms 29 are of a curved formation at an intermediate point, having a comparatively large circular opening 72, (see Fig. 15,) through which the intermediate shaft 31 passes. Immediately below this opening is formed a long narrow slot 73, in which a crank-pin 74, projecting from a disk 75, mounted on the lower shaft 32, engages. The lower end of the lifting-arms have lateral projections 76, provided with depressions 77, adapted to fit over the pins or extensions 78 of a flask 79. The lifting-arms are provided with devices which form stops to limit their outward and inward movement. These devices preferably consist of collars 80, mounted on a short shaft 81, projecting outwardly from the lower end of the lifting-arms, which are adapted to strike against vertical blocks 82, which are arranged on opposite sides of the stationary support 25, and thus limit the outward movement of the arms and downwardly-projecting extensions 83, which strike against the beams 9 of the table, and thus limit the inward movement of the arms. By this means the arms are stopped in their outward movement in proper position to grip the flask and in their inward movement in proper position to accurately deposit the flask on the table over the pattern. The shaft 31 has a beveled gear-wheel 84, which meshes with the beveled gear-wheel 85 on a transverse shaft 86. The opposite end of the transverse shaft has the bevel gear-wheel 87, which meshes with the gear-wheel 88 on the main shaft 42. (See Fig. 2.)

The operation of this portion of the invention is as follows, referring to Figs. 14, 15, and 18: The rotation of the main shaft 42 turns the eccentric 45, thereby rocking the arm 48 and the shaft 49. This moves the connecting-rod 50 and turns the members of the knuckle-joint device on their pivot at an angle to each other, thereby lowering the slotted bar 58 and the angular hooked bar 60. (See Fig. 18.) This moves the diagonal connecting-rods 65 downward and spreads the lower end of the lifting-arms 29. (See Fig. 14.) The arms 29 are now swung forward by the movement of the crank-pins 74 in the slots 73 of the arms until the stop-collars 80 strike the vertical stop-blocks 82. (See Fig. 15.) The arms 29 are now in proper position to grip the flask. The knuckle-joint device now begins to move its members from their angular position into alinement, which lifts the angular hooked bar 60 and brings the arms 29 toward each other to grip the flask, being limited in their closing movement by the pipe or tube 69. The upward movement of the bar 60 lifts the flask off the stationary table, and the operation of the crank-pin 74 in the slot 73 swings the arms 29 and flask inward over the flask-supporting table. Then downwardly-projecting extensions 83 strike against the beams 9 and limit the inward movement of the arms 29. The arms 29 now lower and deposit the flask upon the table in the manner reverse to that heretofore described with reference to the removal of the flask from the stationary table.

*The facing mechanism.*—The first operation after a flask has been deposited upon the table is to face or cover the pattern with a small quantity of fine sand before the sand proper is placed thereon in order to give the mold a smooth finish. This is performed by automatic mechanism, which is preferably constructed as follows, reference being had to Figs. 1, 2, 24, 26, and 27: A bin 89, filled with facing material, is arranged in proximity to the machine, and a conveying device is automatically operated from the machine and arranged to elevate the facing material from the bin to a rectangular open frame 90, which supports a sieve 91. (See Fig. 26.) The conveying device consists of an endless band formed of a series of flexible belts 92, which are mounted upon upper and lower drums or pulleys 93 and 94. The lower pulleys or drums 94 are mounted on the lower shaft 95, which is journaled in bearings 96, arranged on the outside of the bin, and the upper pulleys or drums 93 are mounted on the upper shaft 97, journaled in bearings 98 in an angular bar 99, fastened to the rectangular frame 90. (See especially Figs. 24 and 26.) The endless band consists of the series of belts 92, each one of which is arranged on one of the upper and lower pulleys 93 and 94, and a series of transverse bars 100, which connect the belts to each other. A plurality of buckets are attached to the endless band. These buckets are each preferably formed in three parts, as shown in Fig. 27, the middle part 101 being of a narrow elongated trough formation divided into three equal compartments by partitions 102 and the end parts 103 being substantially the same length of one of the compartments. A platform 104 is mounted beneath the upper portion of the conveying-band to prevent sagging of the loaded portion of said band, and thereby enable the hooks to always engage the transverse connection 100.

The mechanism for operating the endless band and brackets is as follows: A two-part rock-shaft 105 is journaled in bearings in the lower extreme of hangers 106, one of which is suspended from the shaft 306 and has the ends of its parts united by a ball-coupling 107. A crank-arm 108 is mounted on this shaft and has pivotal connection at one end with a V-shaped band operating device 109. (See Fig. 24.) The lower ends of the V-shaped device are connected to a transverse rod 110, having wheels 111, which are provided with peripheral grooves 112 and are adapted to travel on the tracks 113, as shown in Figs. 24 and 26. Rods 114 extend downwardly from the transverse rod 110 and have hooks 115, adapted to catch over the transverse connections of the band, as shown in Fig. 26. A counterbalancing-weight 116 is mounted on the opposite end of the crank-arm 108. The shaft 105 is rocked by means of a crank-arm 117, which is mounted on the shaft and provided with a roller 118 at its projecting end adapted to engage and travel on the beveled surface 119 of a cam 120, mounted on a horizontal shaft 121, journaled in the machine-frame. The sieve 91, through which the facing material passes before reaching the patterns, is agitated by mechanism connected to the sand-box, which will be hereinafter described. The sieve 91 is preferably rectangular in form and is suspended beneath the rectangular frame 90 by rods 122, which are pivotally connected at their respective ends to the sieve and frame, so that the sieve can swing back and forth in its agitating movement.

The conveying device for the facing material is operated from the machine heretofore set forth, and the manner of removing the facing material from the bin by the buckets will be easily understood by referring to Fig. 26.

*Sand conveying and delivering mechanism.*—A sand conveying and delivering mechanism is employed to convey sand from a suitable receptacle to the sand-box on the machine. Reference is to be had to Figs. 1, 2, 34, and 69 for the details of this mechanism, which consists of a long trough 123, in which a plurality of conveying-blades or hoeing devices 124 are transversely arranged. These blades are pivoted between two parallel metal bars 125, which are slidably mounted in the trough. The bars 125 are reciprocated in the slideways 126 by means of a connecting-rod 127, which is pivoted to a crank 128 on a shaft 129. The blades when returning swing freely on their pivots, and thus pass easily over the sand, and when moving in the direction to carry the sand toward the sand-box they are held in vertical conveying position by the inward-projecting pins 130, which limit the swinging movement of the blades in one direction. A pair of rollers 131 and 132 are mounted in bearings in the trough 123, near the sand-box, through which the sand passes to remove lumps before passing into the sand-box. A long rectangular opening 133, substantially as shown in Fig. 2, is formed in the bottom of the trough and immediately above a sand-box 134, and the sand is dumped by the blades into this box, gradually filling the same. The sand-box is mounted above and outside of the path of travel of the flask-supporting table. The sand in the box is scraped level with the bottom surface of the box by the blades 124, and the surplus sand is conveyed to the forward end 135 of the trough, which is provided with a bottom opening 136, through which the sand falls. After the sand-box 134 is filled with sand it is dumped upon an agitating-sieve 137 by automatically freeing the two parts of its pivoted bottom 138, thereby permitting the weight of the sand to swing the two parts of the bottom downward to drop by gravity, substantially as shown in Figs. 31 and 74. The two-part bottom is locked in its closed position by an angular bar 139, having a shoulder 140, adapted to fit against the projecting ends of one of the pivoting-pins 141. A metal piece 142 is mounted on the projecting part of the other pivoting-pin 143 and has two diverging arms 144 and 145, to one of which an end of the locking-bar 139 is pivoted, and the other arm having a counterbalancing-weight 146. The locking-bar 139 is lifted to free its shoulder from the projecting portion of the pivot-pin by a tripping-lever 147, which is pivotally mounted on an angular arm 148, projecting from the side of the sand-box, and is moved to trip the locking-bar by a projection 148ª on the side of a gear-wheel 149, mounted on the main shaft 42, which operates against a roller 149ª, rotatably mounted on the end of the tripping-lever, substantially as shown in Figs. 75 and 76. The gear-wheel 149 meshes with a gear-wheel 149ᵇ, mounted on the shaft 121, so that the main shaft 42 is driven from the shaft 121. (See Figs. 1, 2, and 69.) A crank-arm 150 is mounted on the pivot-pin 141, and a connecting-rod 151 is pivotally connected at its ends to the arm 143 of the metal piece and the crank-arm 150. By this means the two parts of the sand-box bottom are connected so that they will swing in unison. The weight 146 automatically returns the two parts of the sand-box bottom to their closed position as soon as the sand passes out of the box. This closing movement is accelerated by the angular bars 152, which are pivoted to opposite sides of the sand-box and have diagonally, inwardly, and downwardly extending portions beneath the bottom, which are provided with rollers 153 at their inner extremes, upon which the bottom parts strike at the limit of their opening movement, the outer extremes of the bars being connected to coil-springs 154. The sieve beneath the sand-box is agitated, preferably, by cam mechanism constructed as shown in detail in Figs. 35 and 36. A short vertical shaft 155 is journaled at its upper end in bearings 156 in a bracket 157, fastened to the sand-box frame 158 and journaled at its lower end in a bearing 159, supported by a bracket 160, which is also fastened to the sand-box frame. The lower bearing 159 is braced or supported by a diagonal brace 161. The cam 162 is substantially triangular in form, with concaved sides, (see Fig. 36,) and is mounted on the shaft 155, and a block 163 has a longitudinal horizontal slot 164, through which the cam passes, and a longitudinal vertical slot 165, through which the vertical shaft passes. The cam 162 is so arranged that both of the rollers are always in contact with the cam-surface. This will be noted by referring to Fig. 36. Two rollers 166 are pivoted to the horizontal slot 164 at or near the ends thereof and are adapted to roll upon the surface of the cam 162. The flat vertical arm 167 is arranged on each side of the bearings 156 and 159 and is rigidly fastened thereto by bolts 168. A bifurcated extension or fork 169 projects from one end of the block 163 and has a reciprocating movement when the cam is rotating, and a connecting-rod 170 has one end pivoted between the bifurcations and its opposite end pivoted to a lug 171, extending from the sieve 91. The vertical shaft 155 has a bevel-gear 172 at its upper end which meshes with the bevel-gear 173, mounted at one end of a short horizontal shaft 174, which is journaled at one end to the journal-box 175, mounted on the bracket 157, and at its opposite end in a bearing 176, which is mounted in a brace 177, extending from one of the bed-pieces down to the sand-box frame.

The sieve 91 for the facing material is oscillated from the sand-box sieve 137 by mechanism substantially as follows, as shown in Figs. 30 and 70: A short vertical shaft 178 is journaled in an extension 179, fastened to the rectangular frame 90. A crank-arm 180 extends from near the upper end of the vertical shaft 155 and is pivoted to a rod 181, connected to the sand-box sieve. (See right-hand portion of Fig. 30.) A second crank-arm 182 projects from near the lower end of the vertical shaft 178, and a rod 183 is pivoted at its ends to the second crank-arm 182 and a lug 184 on the facing-sieve 91. The sand is sifted by the agitation of the sand-box sieve 137 through a guide 185 into a lower shifting shell or box 186, as shown in Fig. 74. The shifting shell has a radial reciprocating movement from position above the flask-supporting table to position below the sand-box, and vice versa.

*False-flask mechanism.*—When the shifting box or shell is filled with sand, it is moved inwardly over a false flask 187 and vertically above the flask-supporting table by automatically-operated mechanism, preferably constructed as follows, reference being had to Figs. 37, 38, 39, 40, 74, 83, and 84: A mutilated gear-wheel 188 is mounted on the main shaft 42 and rotates with said shaft and meshes with a gear-wheel 189, mounted on a shaft 190, journaled in boxes 191, vertically beneath the main shaft, as shown in Figs. 37, 83, and 84. The shaft 190 has a crank-arm 192 at each end which extends diametrically opposite to each other, and connecting-rods 193 are pivoted at their respective ends to the cranks and a pair of parallel rack-bars 194. (See Figs. 38 and 39.) Slideways 195 are fastened to the bed-pieces of the machine and are provided with depending lugs 196, in which rollers 197 are journaled, and the rack-bars 194 are slidably mounted in the slideways 195 to travel on the rollers 197. (See Fig. 37.) A cross-brace 197ª connects the bed-pieces and has an opening through which the central vertical shaft 3 of the machine passes. (See Fig. 39.) A segmental gear-wheel 198 is rotatably mounted on the central shaft 3 and has toothed segments which engage with the teeth in the rack-bars 194, as shown in Fig. 39. The segmental gear-wheel 198 is provided with a depending sleeve 199, which rotatably encircles the vertical shaft 3, as shown in Fig. 74. A V-shaped or bifurcated frame 200 is secured to the lower portion of the sleeve 199 and supports what I term a "false flask" at its outer end. This portion of the mechanism is shown in detail in Figs. 40, 70, and 74. The false flask is in the form of a shell 201, having a top outwardly-extending surrounding flange 202. (See Figs. 40 and 70.) The false flask is of sufficient size to hold enough loose sand to fill an ordinary flask when rammed. The mutilated gear-wheel 188 has teeth on one-half of its surface only, so that the gear-wheel 189 turns during one half of the revolution of the mutilated gear-wheel and remains stationary during the other half. Means are provided for locking the shaft 190 in an unrotatable position and preferably consist of devices mounted on the shaft 190 and the main shaft 42 so that they will engage when the plain untoothed surface of the mutilated gear-wheel 188 is passing the gear-wheel 189.

The device attached to the main shaft 42 is in the form of a cam 203, the surface of which is semicircular in form. This cam has two depressions 204, arranged one on each side of the main shaft, and a metal block 205, mounted on the lower shaft 190, has a concaved outer surface, which fits the corresponding curved semicircular surface of the cam.

In operation the cam slides in the concavity in the block, and thereby holds the shaft 190 against rotation for one-half of the revolution of the main shaft 42 and then passes out of the concavity and permits the block to make one revolution, the depressions 204 permitting the block to turn, substantially as shown in Figs. 83 and 84. By this means the shaft 190 receives one revolution during one-half of each rotation of the shaft 42, and thus remains stationary during the remaining half of each revolution, the shaft 42 having continuous rotation and the shaft 190 being revolved intermittently. The turning of the gear-wheel 189 slides the rack-bars 194 in opposite directions and rocks the segmental gear 198. This swings the false flask 201 beneath the path of travel of the shifting shell 186 and at the same time turns the shifting shell inwardly into position vertically above the false flask and drops its contents into said false flask, substantially as shown in Fig. 74. The mechanism for moving the shifting shell 186 inwardly is automatically thrown into operation by the swinging movement of the false flask and its frame, as shown in Figs. 30, 31, 32, 33, 40, 41, 42, 69, 70, and 74. A cam 206 is mounted on a curved bar 207, connecting the members of the V-shaped frame 200. The cam 206 is in the form of an annular channeled part, as shown in Fig. 40, and an angular bar 208 has a roller 209, which is adapted to travel in said channel. The opposite end of this bar is connected to the upper end of a lever 210, which is pivoted to a vertical standard 211, and the lower end of the lever is connected by a pivotal link 212 to the lower end of a comparatively long bar 213, which has a two-part collar 214, encircling one member 215 of the clutch device. (See Figs. 30, 31, 32, 33, 77, and 78 for details of this mechanism.) The upper end of the long bar 213 is pivoted to a hanger 216, which is fastened to the ceiling of the room in which the machine is located. (See Figs. 1 and 69.)

The clutch device above referred to consists of a fixed member 217, the two segments of which are rigidly bolted around the shaft 121, and a movable member 215, the segments of which rigidly embrace a sleeve 219, loosely mounted on the shaft. (Shown in detail in Figs. 30, 31, 33, 77, and 78.) The fixed member 217 has lateral extensions 220, which seat in depressions 221 in the movable member 215 when the two members are in clutching engagement. (See Figs. 30 and 31.) The collar 214 loosely encircles the movable member and is pivoted to a rotatable ring 222, which is rotatably fitted in an exterior annular depression 223 in the movable member 215. (See Figs. 33, 77, and 78.) An eccentric or cam 224 is mounted on the sleeve 219 at one side of the movable clutch member 215, the sleeve projecting sufficiently to afford support. (See Figs. 30, 31, and 69.) A collar 225 is fitted around the cam 224 and has a rod 226, which connects at its lower end to a crank-arm 227, mounted on a rock-shaft 228, which is journaled at its ends in bearings 229 in the sand-box frame. (See Figs. 30, 31, 69, and 74.) The connecting-rod 230 is pivoted to a second crank-arm 231, which extends from the shaft 228 at an angle to the first crank-arm 227, and a lug 232 on the side of the shifting shell 186. The cam device 224 is locked in one position by means of a latch 233, which is mounted in slides 234, attached to a plate 235, supported from the hanger 216. This latch is automatically retracted to release the cam by a shifting movement of the long bar 213 by means of a connecting-rod 235ª, which is pivoted at its ends to the long bar and the lower end of a rocking lever 236, the upper end of the rocking lever being pivoted to the latch 233. (See Figs. 31 and 32.)

The shifting shell 186 has wheels 237, journaled on each side, which roll on the rail-surface 238. (See Fig. 31.) The shifting shell is guided in a central position when traveling and is limited in its movements by means of a guide-bar 239, provided with an enlarged end having a longitudinal slot 240, through which the central vertical shaft 3 of the machine extends. (See Fig. 30.) The shifting shell is also prevented from tipping when traveling by an angular brace 241, which extends from the inner face of the shell and curves upwardly, having a roller 242 at its upper end, which travels on the lower surface of a rail 243, extending from the sand-guide 185. (See Figs. 30, 31, and 74.) The bar 208 has a longitudinal slot 244 at one end, through which a bolt 245, fastened to an angular guide 246, is fitted. (See Fig. 40.) This affords means for supporting and limiting the movement of the angular bar 208. A coiled spring 247 is fastened at its respective ends to the upper end of the lever 210 and the sand-box frame and serves to maintain the clutch members in a separated inoperative position with a spring tension. (See Figs. 31 and 69.)

The operation of the shifting-shell mechanism will be easily understood from the foregoing description.

The flask-supporting table is moved by the swinging of the false-flask mechanism in one direction. The false flask is provided with two oppositely-arranged pivotal stop-bars 248 and 249, one of said bars being pivoted to each member of the V-shaped frame 200 and having their inner ends sufficiently separated to receive one of the projections 17, extending from the inner ring 15 of the flask-supporting table, substantially as shown in Fig. 70. The false flask is swung by mechanism heretofore described beneath the path of movement of the shifting shell and above one of the flasks on the table and at the same time or almost immediately after the shifting shell is moved inwardly to a position vertically above the false flask, thereby dumping the sand in the shifting shell into the false flask and the flask beneath the false flask, substantially as shown in Fig. 74. The false flask is now swung in the opposite direction, and as it is locked temporarily to the flask-supporting table it carries that table with it. When the false flask reaches the position vertically beneath the ramming mechanism, it stops and the sand is rammed into the flask below by automatically-operated ramming mechanism.

*Ramming mechanism.*—This mechanism preferably consists of a plurality of ramming-hammers which are connected together in groups or series and arranged so that the hammers drop at different intervals. In the adaptation of the invention which I am now describing twenty-four hammers are employed, which are arranged in a rectangular set, as shown in Figs. 43, 47, and 67, and slightly smaller in size than the opening in the flask. These hammers are divided into four groups—two end groups and two intermediate groups between the end groups. The end groups are each composed of four side hammers 250, two end hammers 251, and one interior hammer 252, and the intermediate groups are each composed of four side hammers 253 and one interior hammer 254. Each of the hammers has a vertical rod, and the rods 255 of the interior hammers are longer than the rods 256 of the end and side hammers. (See Figs. 43 and 44.) The rods 256 of the end and side hammers of each group are connected to the rod 255 of the interior hammer of the group so as to operate in unison. A sectional two-part collar 257 (shown in detail in Figs. 47, 48, and 51) is rigidly clamped around each rod 255 and has radial arms 258, provided with bifurcated ends 259, which partially encircle the rods 256 of the exterior hammers. The space 260 between the outer ends of the bifurcations 259 is slightly greater than the diameter of the rods 255, so that the rods can be introduced into and removed from their position between the bifurcations. Each rod is fastened in the nearly-circular space 261 between the bifurcations by a collar 262, fitted on and locked to the rod by a set-screw 263, which passes through a ring 264. This collar when in place fits the annular space between the inner edge of the bifurcations and the outer surface of the rod and has a top flange which fits upon the top surface of the bifurcations. The rods can be easily removed by withdrawing the collars from the position between the rods and bifurcations. (See Fig. 52.) Two of these radially-armed collars are employed for each group, one being connected to the rods at a short distance above the hammer-blocks and the other being locked at the top of the rods of the interior hammers. (See Figs. 43 and 44.) The set-screws 263 and the ring 264 are not necessary in the upper collar construction. The hammers are also connected to each other by short guide-rods 265, each of which is rigidly fastened to the rod of one hammer and has a forked end which straddles the rod of another hammer. (See Fig. 49 for detail of guide-rods, also Figs. 43 and 44 for guide-rods in position.) The rods 255 have disks 266 at their upper ends, which fit in air-cylinders 267 and form air-cushions. (See Figs. 43, 44, 69, and particularly Figs. 81 and 82.) A collar 268, having lateral lugs 269 and 270, is mounted near the upper end of each of the rods 255. (See Figs. 43, 44, 45, 46, 81, and 82.) A series of cams 271 are mounted on the shaft 121 and operatively engage the lugs 269 to lift and drop the hammers. (See Figs. 43, 44, 45, 69, 81, and 82.) The hammers of each group are locked in their elevated position by locking devices all mounted on a single rock-shaft 272, journaled in the bed-pieces at one side of the shaft. (See Figs. 44 and 82.) Arms 273, which extend from the shaft 272, have lateral extensions 274, each of which fits under one of the lugs 270. The shaft 272 is rocked to turn the arms from engagement with the lugs 270 by a substantially horizontal crank-arm 275, which carries a roller 276, adapted to travel upon the outer edge of a cam 277, mounted on the main shaft 42. (See Fig. 44.) By this means the hammers are automatically elevated, locked in their elevated position, and then released and allowed to drop by gravity. The cams elevating and controlling the groups are arranged so that one portion of the hammers will be dropped an instant before the remainder, as shown in Fig. 69, so that the air in the sand will have a chance to escape. This is accomplished by making the upper portion of one cam slightly larger than another, so that its upper edge will project in front of the edge of the other cam, substantially as shown in dotted lines in Fig. 44 and in full lines in Fig. 81. Mechanism is also provided for locking the hammers permanently in their elevated position, as shown in Figs. 65 and 82, which consists of a crank-arm 278, mounted on the shaft 272, and having a roller 279, which fits in a notch 280 in the upper end of a locking-lever 281, loosely mounted on the main shaft.

An operating-rod 282 extends from the lever 281 to a point convenient to the operator, so that the hammers can be instantly locked to prevent their descending upon a flask which from some reason has not filled with sand, and thus obviate the danger of smashing the pattern by moving this arm to swing the lever so that the crank-arm roller 279 will engage in the notch, thereby locking the shaft 272 against partial rotation. A long curved arm 283 extends from the shaft 272 and is connected to a spring 284, the tension of which rocks the shaft 272 when released to disengage the lateral extension 274 from the lugs 270 and permit the hammers to drop. (See Fig. 44.)

While any of the ordinary flasks adapted for machines can be used successfully on this machine, I prefer to employ an improved flask which is strengthened and braced by transverse and longitudinal connections, means being provided so that these connections will not interfere with the action of the hammers. A flask of this improved construction is shown in Fig. 53 and has transverse or cross connections 285 and longitudinal connections 286, which extend and connect the cross connections.

The hammers are provided on their bottom surface with a series of transverse and longitudinal grooves or depressions 287 and 288, as shown in Figs. 54, 55, 56, and 57, similar in number and arrangement to the transverse and longitudinal connections 285 and 286, into which said connections pass to permit the ramming portions of the hammers to pack the sand when the hammers descend. The hammers are also cut out on their bottom surface to a form substantially similar to the pattern as shown at 286$^a$ in Fig. 58, as it is found by experience that the sand is packed better and more evenly when the contacting surface of the ramming mechanism corresponds in a degree to the angular form of the pattern. The bottom of each groove or depression 287 in the side hammers 250 slants outwardly and upwardly, as shown in Fig. 57. The object of this is to provide a slanting surface which will force the sand between the transverse connection of the flask in the bottom of the groove outwardly instead of packing the sand between two surfaces, as would be the case were the bottom of the groove horizontal instead of at an inclination.

The hammers in operation strike a plurality of blows, preferably three, as in the machine shown, in order to remove all the air and perfectly condense the sand.

*Temporary support for flask-support table.*—A support is provided for the part of the flask-supporting table beneath the hammers and preferably consists of a base 289 and automatic mechanism on said base for lifting supporting parts against the lower surface of the table, as shown in Figs. 59, 60, and 69. A metal plate 290 is mounted on the base, on which two journal-boxes 291 are placed, and a rock-shaft 292, journaled in said boxes, projects beyond the ends of the base and carries cams 293, arranged in pairs on each projecting end. A vertical bar 294 is mounted on each side of the base and has a longitudinal slot 295, through which the projecting end of the shaft 292 passes. A short horizontal shaft 296 is journaled in the upper end of each bar and has circular rings 297, arranged vertically above the cams. The lower end of each bar is also provided with a longitudinal slot 298, through which a pin 299, projecting from the base, passes. A washer 300 is mounted on the pin 299 and fits between lugs 302, projecting from the bar. A crank-arm 303 extends from the rock-shaft 292 and is pivotally connected to one end of a connecting-rod 304. The opposite end of the connecting-rod is pivoted to one end of an angular lever 305, which is rotatably mounted on the driving-shaft 306 of the machine. The driving-shaft 306 has a pulley 306$^a$ for connection to a source of power and is geared to the shaft 121 by gear-wheels 306$^b$ and 306$^c$, mounted on the respective shafts. The opposite end of the lever 307 is pivoted to a bar 308, which has a slot 309, through which the main shaft 42 passes, and two rollers 310 and 311 are arranged in opposite sides of a cam 312, mounted on the main shaft 42. (See Figs. 61 and 62.) Each section or part of the flask-operating table has a pair of plates 313, bolted or otherwise rigidly fastened to their bottom surface, from which lugs 314 project beyond the outer edge of the table. These lugs are separated slightly from each other, and an arm 315, extending from the rock-shaft 292, is adapted to be fitted snugly between the lugs by the movement of the shaft to elevate the table-supports, substantially as shown in Figs. 10 and 69. This locks the table firmly and rigidly in proper position, so that the flask about to be rammed is in exact position vertically beneath the hammers. A roller 316 is rotatably mounted on the outer end of the crank-arm 315, which may be rotated by contact with either of the lugs 314 as it enters between them.

*Flask-removing mechanism.*—Automatic mechanism for removing flasks from the table after the molds have been completed is located on one side of the ramming mechanism. This automatic mechanism is substantially similar in principle and operation to the automatic mechanism described in an earlier part of this specification for lifting flasks from a stationary support and depositing them upon the table, the difference being in form and construction. This mechanism is shown in Figs. 1, 2, 68, and 69. A receiving platform or support 317 is arranged in proximity to the flask-supporting table, upon which the flasks are deposited after they are lifted from the flask-supporting table. (Shown in Figs. 1 and 69 and in dotted lines in Fig. 70.) The flasks may be removed from this receiving-support by manual means or any convenient mechanical means. A pair of lifting-arms 318 are pivoted in separated position to a horizontal shaft 319, which is mounted so as to have a vertical movement and also a slight horizontal side movement against springs. Means are provided for moving the lower ends of the pair of lifting-arms toward or from each other for attachment to or detachment from a flask-supporting table and for elevating and lowering said arms and moving them inwardly and outwardly. The lifting-arms 318 are sufficiently loose on the shaft 319 to permit the necessary movement of the lower ends toward or from each other. Two shafts 320 and 321 are journaled in bearings in angular frame-bars 322 and are connected by meshing gear-wheels 323 and 324. These angular frame-bars 322 are rigidly fastened at their lower ends to angle-irons 325, which project from and are bolted to one of the bed-pieces. Two rods 326 have their lower ends journaled on the intermediate shaft 320 and their upper ends provided with elongated vertical slots 327, as shown in Fig. 69, through which the upper shaft passes. The length of the opening in each rod is regulated by a block 328, (shown in Fig. 69,) having a concaved upper surface fitting the lower surface of the shaft 319. This block 328 is vertically adjusted in the slot by set-screws 329, thereby providing means for limiting and adjusting the vertical movement of the upper shaft 319. The slots 327 and blocks 328 are exact duplicates of the slot 37 and block 38 shown in detail in Fig. 17. The intermediate shaft 320 is connected to the intermediate shaft 31 of the flask-depositing mechanism, so as to rotate in unison therewith, by a shaft 330, having ball-and-socket angle-couplings 331, as shown in Figs. 1, 2, and 14. A cam 332 is mounted on the main shaft 42, and a pair of parallel separated arms 333 are rotatably mounted on the main shaft in juxtaposition to the cam and on each side of said cam. (Shown in Figs. 1, 2, 68, 69, and in detail in Fig. 85.) These arms 333 extend diagonally outwardly and inwardly from the main shaft 42 and are connected at their outer ends to the upper supporting-bar 334, the lower end of which has an opening through which the intermediate shaft 320 loosely passes. (See Fig. 68.) Another pair of parallel separated rods 335 are pivoted at the lower end to the outer end of the first-mentioned arms 333 and extend diagonally upward. A roller 336 is located between the upper ends of the pair of rods 335, and an upright bar 337 has a bifurcated lower end 338, between which the upper ends of the rods 335 are pivoted by a pivot-pin 339, which also serves as a supporting-shaft for the roller 336. (See Figs. 68 and 85.) An inner horizontal shaft 340 is journaled in the upper ends of the angular frame-bars 322, and two bars 341 have collars at their inner ends 342, which loosely encircle the inner shaft 340, and intermediate semicircular depressions receive the upper shaft 319. These bars 341, which extend outwardly and gradually converge toward each other, are provided with enlargements 343 at their outer end, having longitudinal slots 345. (See Figs. 2 and 69.) A cross-bar 346 is fastened at its middle to the vertical bar 337 near the upper end thereof and has its ends beneath the outer ends of the converging bars 341, to which it is secured by bolts 347, which pass through the longitudinal slots 345. (See Fig. 2.) An upper bar 348 has a collar 349 at its inner end, which loosely encircles the inner shaft 340 and is pivoted at its outer end to the vertical bar 337. The middle portion of this bar is provided with a longitudinal vertical slot 350. (See Figs. 1, 2, and 69.) The upper end of the angular bar 351 is pivoted in the slot 350 in the slotted bar 348 by a pivot-pin 352, and its lower end is bent or curved upon itself to form a hook 353, which extends beneath and partially around the lower shaft 321. (See Figs. 1, 68, and 69.) A transverse horizontal cross-bar 354 is formed integral with the lower end of the angular bar 351. Two connecting-rods 355 are respectively pivoted at their upper ends to the opposite ends of this transverse cross-bar. These connecting-rods extend diagonally downward and outward and are pivoted at their lower ends to lugs 356, extending from the lower ends of the lifting-arms 318. The lifting-arms are connected at their lower ends, so as to limit their movement toward each other, the lugs 356 being provided with deep depressions 357, in which the ends of a rod similar to the rod 68 shown in Fig. 23 fit and slide. A pipe or tube 359 surrounds this rod and extends between the lugs 356, the ends of the tube or pipe being adapted to contact with the lugs to limit the closing movement of the lugs 318. A detail of this mechanism is not shown, as it is exactly similar to that shown in Fig. 23 with reference to the depositing mechanism. The lower hooked end 353 of the angular bar 351 is retained in a central position by means of the short arms or stops 360, which are hung loosely from the shaft 320 on opposite sides of the hooked end. These short arms or stops 360 are locked against outward longitudinal movement on the shaft by the collar 361. (See Figs. 68 and 69.) Both of the lifting-arms are of a curved formation at an intermediate point, having a comparatively large circular opening 362, (see Fig. 1,) through which the intermediate shaft 320 passes. Immediately below this opening is formed a long narrow slot 363, in which a crank-pin 364, projecting from a disk 365, mounted on the lower shaft 321, engages. The lower end of the lifting-arms have lateral projections 366, provided with depressions 367, adapted to fit over the pins or extensions 78 of the flask 79. The lifting-arms are provided with devices which form stops to limit their outward and upward movement. These devices preferably consist of collars 369, mounted on a short shaft 370, projecting outwardly from the lower end of the lifting-arms, which are adapted to strike against vertical blocks 371, which are arranged on opposite sides of the stationary support 317, and thus limit the outward movement of the arms, and downwardly-projecting extensions 372, which strike against the beams 9 of the table, substantially as shown in Fig. 1, and thus limit the inward movement of the arms. By this means the arms are stopped in their inward movement in proper position to grip the flask and in their outward movement in proper position to deposit the flask on the stationary support.

The flask-removing mechanism operates as follows, referring to Figs. 1, 2, 68, and 69: This mechanism in its normal position is arranged so that its arms are in position to grip a flask, and the first step is to move the arms toward each other to grip the flask. The cam 332 operates against the roller 336, pivoted in the lower end of the vertical bar 337, and elevates the bar 337, which by means of its cross-bar 346 lifts up the outer ends of the converging bars 322, and thereby raises the upper shaft 319. This lifts the angular hooked bar 351 and moves the lower ends of the arms toward each other to grip the flask. This gripping movement is limited by the tube 359. The arms are also elevated by the upward movement of the shaft 319. The movement of the crank-pin 364 in the slot 363 swings the arms and flask outwardly over the ramming-support. The cam 332 now lowers the bar 337, which in turn lowers the converging bars 341. This lowers the upper shaft 319, which moves the arms downward and deposits the flask on the receiving-support. The downward movement of the angular hook-bar now spreads the arms and releases the flask. An extra automatic friction brake or lock is provided to assist the crank-arm 315 in stopping the flask-supporting table at the limit of its intermittent movements, which is preferably constructed substantially as shown in Figs. 1, 37, and 70. A projecting bar 373 is bolted to the end of one of the rack-bars and has an inclined or beveled lower edge which operates against a roller 374, journaled in the upper end of a vertical shaft 375. The vertical shaft 375 is slidably supported near its upper extreme in upper collars or hubs 376 and near its lower end in the lower extreme of an inclined brace 377 and has a friction-block 378, of wood or other suitable material, which is adapted to be moved downward into frictional engagement with the inclined inner surface 379 of the inner circular ring 15 of the flask-supporting table. (See Fig. 70.) The purpose of the friction brace mechanism is to slow down the speed of the flask-supporting table as it approaches the limit of its intermittent movement and also serves as an additional locking mechanism. This permits the table to be rotated faster and increases the capacity of the machine. Automatic mechanism is provided for unlocking the false flask from the flask-supporting mechanism, which is preferably as follows, reference being had to Figs. 69, 70, and 86, especially Fig. 70: The false flask 201 is unlocked from the flask-supporting table by means of a vertical rod 380, which is engaged at its upper end by a cam 381, mounted on the main shaft 42, and has an intermediate collar 382, loosely fitting around the shaft 190, and a roller 383 at its lower end, which impinges against a vertical rib 384 on the pivotal stop-bar 249 and moves the stop-bar sufficiently to release the projection 17 and allow the false flask to be swung back into position over the second flask after the sand in the first flask is rammed. The false flask in swinging scrapes the extra sand off of the first flask and leaves a level top surface, which is then smoothed and finished by the passage of the lower edge of a steel plate 385, which is bolted to the radial extension 386 of an angular part 387, extending from the V-shaped frame. (See Figs. 40 and 42.) The plate 385 is vertically adjustable and can be easily removed and replaced when worn or damaged, as the bolts 388 pass through vertical slots 389 in the radial extension 386, as shown in Figs. 79 and 80.

*The operation of the machine.*—The operation of the preferred adaptation of the machine heretofore described and as shown in the drawings is as follows: A flask being arranged in proper position on the stationary support 25 and the machine started, the lifting-arms 29 are actuated by the mechanism heretofore described and remove the flask from the support to the flask-supporting table 6 in position over a pattern. The flask-supporting table 6 now makes a partial rotation, carrying the flask to the facing mechanism, where the pattern is faced, as described, and at the same time a second flask, which has been deposited on the stationary support 25 by the operator, is removed to the next section of the flask-supporting table 6 by the lifting-arms 29 and their actuating mechanism. The table now makes a second partial revolution, carrying the first flask to the sand-delivery mechanism and the second flask to the facing mechanism, where the operations of filling the first flask with sand and facing the second flask are performed, as heretofore described. A third flask is also deposited on the third section of the flask-supporting table during the second intermission. The flask-supporting table 6 now makes a third partial revolution and carries the first flask beneath the ramming-hammers 250, the second flask to the sand-deliverying mechanism, and the third flask to the facing mechanism. During this intermission (the third) the ramming-hammers 250 descend and ram the sand in the first flask, as before described. The shifting box 186 now moves inwardly and delivers the sand contained therein into the false flask 201 and the second flask beneath the false flask 201 and then returns to its outer position. The third flask is faced at the same time that the first flask is rammed, and a fourth flask is placed on the fourth section of the flask-supporting table. A fourth partial rotation of the flask-supporting table 6 now takes place, carrying the first flask to the removing mechanism, the second flask to the ramming-hammers, the third flask to the sand-delivering mechanism, and the fourth flask to the facing mechanism, and while the first flask is taken from the flask-supporting table and deposited on the receiving-support by the mechanism before described the other flasks on the table are operated upon by the mechanism heretofore described. In this machine a series of flasks are each operated upon during each stationary interval of the supporting-table, and the different mechanisms for forming and completing molds are in operation only while the table is stationary and locked and supported rigidly against vibration in the exact position required, so that each is practically a perfect mold when finished. The rapidity of the operation of the machine is greatly increased by the mechanism which deposits the flasks on and receives them from the table. This also makes the machine entirely automatic in character. The hammers are not forced down, but drop by gravity, and therefore have all the advantage of hand-ramming, with the additional advantages of uniform even force of blow.

The peculiar form of hammers permits the use of an improved cross-braced and strengthened flask, the cross-braces of which also serve to support the mold.

Many other advantages of the machine and its automatic mechanism have been heretofore mentioned.

I do not desire to confine myself to the exact construction of the mechanism described in the foregoing description illustrated in the accompanying drawings, as parts may be omitted or changed without departing from the scope of the invention as exemplified in the annexed claims.

I claim as my invention—

1. In a molding-machine, a flask-supporting table, means for intermittently moving said table, a stationary support at one side of the table, mechanism for removing a flask from the stationary support and depositing it on the table, and automatic means for operating said removing mechanism during an intermission of movement of said table.

2. In a molding-machine, a flask-supporting table, means for intermittently moving said table, and a plurality of independent mechanisms disposed at different points above the table for depositing a flask, for facing the pattern, for delivering sand and for ramming the sand, and means for automatically operating said mechanisms only during the intermissions of movement of said table.

3. In a molding-machine, a flask-supporting table, means for intermittently moving said table, and a plurality of independent mechanisms disposed at different points for depositing a flask on the flask-supporting table, for facing the pattern, for delivering sand, for ramming the sand, and for removing the flask from the flask-supporting table, and means for automatically operating said mechanisms during the intermissions of movement of said table.

4. In a molding-machine, a support, a flask-supporting table, a pair of opposed pivotal lifting-arms and mechanism for moving said lifting-arms toward each other to grip a flask, for moving said arms upwardly to remove said flask from the support and finally swinging said arms on their pivots in a vertical plane toward the flask-supporting element and then from each other to deposit said flask on the flask-supporting table and release it from said arms.

5. In a molding-machine, a flask-supporting table, supports arranged at different points and exterior to said flask-supporting table, automatic mechanism for removing a flask from one of said supports and depositing it on the flask-supporting table, automatic means for forming a mold in said flask, and automatic mechanism for removing the flask from the flask-supporting table and depositing it on another support.

6. In a molding-machine, the combination with a flask-supporting table and means for intermittently rotating said table, of a plurality of independent and separate mechanisms for depositing flasks on the table, for filling the flasks, for ramming the sand in the flasks and for removing the flasks from the table, and automatic means for operating said mechanisms only during the intermissions of movement of said table.

7. In a molding-machine, the combination with a flask-supporting table and means for intermittently rotating said table, of mechanism for depositing flasks on the table, mechanism for facing the patterns, mechanism for filling the flasks, for ramming the flasks and mechanism for removing the flasks from the table and automatic means for operating said mechanisms during the intermissions of movement of said table.

8. In a molding-machine, a flask-supporting table, mechanism for intermittently rotating said table, a plurality of mechanisms disposed at different points above the table for depositing flasks on the table for forming molds and for removing flasks from said table, and automatic means for operating said mechanisms simultaneously during the intervals of movement of said table.

9. In a molding-machine, a flask-supporting table, means for intermittently moving said table, a plurality of independent mechanisms above the table at different points and each adapted to perform a portion of the work required to complete a mold and to deposit the empty flasks therein and remove the completed flasks therefrom, and automatic means for simultaneously operating said mechanisms during the intervals between the movement of the table, whereby each flask is successively operated upon and a plurality of flasks are simultaneously operated on during each intermission.

10. In a molding-machine, a flask-supporting table, mechanism for forming a mold and mechanism forming a portion of the molding-machine and automatically operated from the driving power thereof, for placing flasks on and removing flasks from the flask-supporting table.

11. A molding-machine having a flask-supporting table, means for intermittently operating said table, mechanism for facing or covering a pattern with fine material, automatic means for operating said facing mechanism, mechanism for filling a flask and mechanism for ramming a flask.

12. A molding-machine having a flask-supporting element, mechanism for depositing flasks on said flask-supporting element, automatic mechanism for facing or covering a flask with fine material, mechanism for filling flasks, mechanism for ramming flasks and mechanism for removing flasks from said flask-supporting element.

13. In a molding-machine, a flask-supporting table, a stationary support at one side of said table, means for intermittently rotating said table, flask-moving mechanism having a rod and a pair of gripping-arms pivoted on said rod and means for moving said arms to grip or release a flask and for raising and lowering the rod and arms and rocking said arms in parallelism on said rod to remove and deposit the flask during an intermission of movement of the table.

14. In a molding-machine, the combination with an intermittently-movable supporting element, and a stationary supporting element at one side of and out of the path of travel of the movable supporting element, of mechanism for removing a flask from one of said elements and depositing it on the other including a shaft, a pair of lifting-arms pivotally supported from said shaft, means for vertically moving said shaft, means for moving the arms on the shaft toward or from each other, and means for rocking said arms on said shaft in parallelism, substantially as set forth.

15. In a molding-machine, the combination with a stationary support, and a movable table, of mechanism for removing the flasks from said support and depositing them on the table including a shaft, journaled above the table, a pair of lifting-arms pivotally supported from said shaft, means for vertically moving said shaft, means for moving the arms toward or from each other and means for limiting the inward movement of the arms.

16. In a molding-machine, the combination with a stationary support, and a movable table, of mechanism for removing the flasks from said support and depositing them on the table including a shaft journaled above the table, a pair of lifting-arms pivotally supported from said shaft, an angular hook-bar having connection with the lifting-arms, knuckle-joint mechanism for raising and lowering the shaft and angular hook-bar and mechanism for swinging the lifting-arms on the supporting-shaft.

17. In a molding-machine, the combination with a stationary support and a movable table, of mechanism for removing the flasks from said support and depositing them on the table including a shaft journaled above the table, a pair of lifting-arms pivotally supported from said shaft and having slots, a hook-bar having connection with the lifting-arms, knuckle-joint mechanism for raising and lowering the shaft and hook-bar, and crank-pins operating in the slots.

18. In a molding-machine, a flask-supporting table having a plurality of plates in annular arrangement, an inner hub, beams extending from the hub to the plates, and an inner ring having support from the beams, said ring being intermediate the plates and hub and approximately concentric with said annular plates.

19. In a molding-machine, a flask-supporting table having a plurality of plates in annular arrangement, an inner hub, beams extending from the hub to the plates and an inner circular ring substantially concentric with and intermediate the hub and plates and composed of a plurality of segments having support from the beams.

20. In a molding-machine, a flask-supporting table having a plurality of plates in annular arrangement, an inner hub, beams extending from the hub to the plates, blocks on the beams and an inner ring intermediate the hub and plates and composed of a series of segments and each segment having a projecting portion fitting upon one of the blocks.

21. In a molding-machine, a flask-supporting table, a bin exterior to the table containing facing material, a frame above the table, a sieve in said frame, conveying mechanism for elevating the facing material from the bin to the sieve, a hook adapted to engage the conveying mechanism, a shaft having a crank and connections between the hook and the crank for reciprocating the hook, substantially as set forth.

22. In a molding-machine, a flask-supporting table, a bin containing facing material, a frame above the table, a sieve in said frame, conveying mechanism for elevating the facing material from the bin to the sieve, a hook adapted to engage the conveying mechanism, a rock-shaft having a crank, connections between the hook and crank whereby the hook is reciprocated and cam mechanism for rocking the shaft.

23. In a molding-machine, a flask-supporting table, a facing-receptacle, an endless band having a plurality of buckets extending from the facing-receptacle to above the flask-supporting table, a hook for operating said band and a platform beneath the upper portion of the endless band for supporting the band, substantially as set forth.

24. In a molding-machine, a flask-supporting table, a bin containing facing material, a frame above the table, a sieve in said frame, conveying mechanism for elevating the facing material from the bin to the sieve, a reciprocating hook adapted to engage the conveying mechanism, a rock-shaft having a crank, connections between the hook and cranks, a cam having a beveled surface and a crank-arm mounted on the rock-shaft and having a roller adapted to travel on the beveled surface of the cam.

25. In a molding-machine, a sand-box having a movable bottom, mechanism for conveying sand to the sand-box, a sieve beneath the sand-box, mechanism automatically operated from the machine for releasing the bottom to deposit the sand on the sieve, and gravity mechanism entirely independent from the automatic operating mechanism for reclosing said bottom after the sand is dumped, substantially as set forth.

26. In a molding-machine, a sand-box having a two-part bottom, pins pivoting said bottom parts to the box, an angular locking-bar for said bottom having a shoulder adapted to engage against one of the pivoting-pins, a metal piece mounted on the other pivoting-pin and provided with two diverging arms, to one of which the locking-lever is pivoted, a counterbalance-weight on the other arm, a crank-arm mounted on one of the pivoting-pins and a rod pivoted to said crank-arm and one of the arms of the metal pieces, substantially as set forth.

27. In a molding-machine, a sand-box, a two-part bottom, each part being pivoted to an opposite side of said sand-box, mechanism connecting said bottom parts whereby they will open and close in unison, a locking-bar for said bottom, a tripping-lever for releasing the bar, means for actuating the tripping-lever, a sieve beneath the bottom and means for adjusting the sieve.

28. In a molding-machine, a sand-box, a pivotal bottom, a counterweight for returning said bottom to its closed position, and spring-tensioned angular bars pivoted to opposite sides of the sand-box and extending diagonally downwardly and inwardly beneath the bottom for accelerating the return movement.

29. In a molding-machine, a sand-box, a pivotal bottom, a counterweight for returning said bottom to its closed position, angular bars pivoted to opposite sides of the sand-box and extending diagonally downwardly and inwardly beneath the bottom rollers at the inner extremes of said bars and springs connected to their outer extremes.

30. In a molding-machine, a sand-box, a sieve beneath the sand-box, brackets fastened to the sand-box, a shaft journaled in said brackets, a cam mounted on the shaft, a block having a horizontal slot through which the cam passes and a vertical slot through which the shaft passes, rollers pivoted in the block and adapted to roll on the surface of the cam, a rod pivotally connecting to the block and sieve, and means for rotating the shaft.

31. In a molding-machine, a central vertical shaft, a flask-supporting table journaled on said shaft, means for rotating said shaft, a sand-box mounted outside of the path of movement of said table, a shifting shell having a guide-bar provided with a slot through which the shaft passes, and means for radially reciprocating said shifting shell, substantially as set forth.

32. In a molding-machine, a central vertical shaft, a flask-supporting table journaled on said shaft, means for rotating said shaft, a sand-box mounted outside of the path of movement of said table, a shifting shell having a guide-bar provided with a slot through which the shaft passes, and a system of pivotally-connected rods operated from the machine for radially reciprocating said shifting shell, substantially as set forth.

33. In a molding-machine, a central vertical shaft, a flask-supporting table journaled on said shaft, means for rotating said shaft, a sand-box mounted outside of the path of movement of said table, a shifting shell having a guide-bar, provided with a slot through which the shaft passes, means for radially reciprocating said shifting shell, and an angular brace extending from the shell and slidably engaging the sand-box, substantially as set forth.

34. In a molding-machine, a central vertical shaft, a flask-supporting table journaled on said shaft, means for rotating said shaft, a sand-box mounted outside of the path of movement of said table, a shifting shell having a guide-bar provided with a slot through which the shaft passes, a system of levers connected to the shifting shell, and cam mechanism operated from the machine and connecting to the levers for reciprocating the shifting shell, substantially as set forth.

35. In a molding-machine, the combination with a sand-box having a movable bottom and means for automatically returning said bottom to a closed position, of spring-tensioned bars extending beneath and adapted to receive the bottom and accelerate the return movement.

36. In a molding-machine, the combination with a flask-supporting table and mechanism for intermittently rotating said table, of a sand-box having a bottom in pivotal sections, means for locking said sections in closed position, mechanism automatically operated from the machine during the intermission of movement of the table for releasing said locking means, and gravity mechanism entirely independent of the releasing mechanism for returning the sections to closed position.

37. In a molding-machine, a sand-box having a bottom in pivotal sections, means for locking said sections in closed position, mechanism for releasing said locking means, gravity mechanism for returning the sections to closed position, and spring-tensioned bars beneath the bottom upon which the sections of the bottom strike when near the limit of their opening movement for accelerating said closing movement.

38. In a molding-machine, a sand-box having a bottom in pivotal sections, means for locking said sections in closed position, mechanism for releasing said locking means, spring-tensioned bars beneath the bottom carrying rollers upon which the bottom sections strike when near the limit of their opening movement, and a weight for returning the sections to their closed position.

39. In a molding-machine, the combination with a sand-box having a movable bottom and means for automatically returning said bottom to a closed position, of bars upon which the bottom strikes at or near the limit of its opening movement and springs having connection to the outer ends of said bars.

40. In a molding-machine, the combination with a sand-box having a movable bottom and means for automatically returning said bottom to a closed position, of angular bars, coil-springs having connection with the outer ends of said bars and rollers at the inner ends of said bars upon which the bottom strikes near the limit of its opening movement.

41. In a molding-machine, a sand-box having a movable bottom, a locking-bar for locking said bottom in closed position, a tripping-lever adapted to move the locking-bar and release the bottom, means for operating the tripping-lever, and spring-tensioned bars beneath the bottom against which said bottom strikes near the limit of its opening movement.

42. In a molding-machine a sand-box having a bottom, means for dropping said bottom, a sieve beneath the sand-box, an approximately triangular cam and a block reciprocated by the cam for agitating the sieve.

43. In a molding-machine, a sand-box having a bottom, means for dropping said bottom, a sieve beneath the sand-box, a shaft carrying a triangular cam and a slotted block reciprocated by the rotation of the cam and having connection with the sieve.

44. In a molding-machine, a vertical shaft, a flask-supporting table journaled on said shaft, a false-flask device journaled on the shaft, means for reciprocating said false-flask device in a curved path, and means for locking said false flask to the table when moving in one direction, whereby the flask-supporting table is intermittently rotated by the false flask.

45. In a molding-machine, a false-flask device, a segmental gear, a rack-bar reciprocated by the segmental gear and operating connections between the false-flask device and the rack-bar, substantially as set forth.

46. In a molding-machine, a sand-box, a shifting shell, a shaft having one member of a clutch mechanism, means for rotating said shaft, a cam device loosely mounted on the shaft and having the other member of the clutch mechanism, connections between the cam device and the shifting shell, and mechanism for moving the members of the clutch mechanism into engagement.

47. In a molding-machine, a sand-box, a shifting shell, a shaft having one member of a clutch mechanism, means for rotating said shaft, a cam device loosely mounted on the shaft and having the other member of the clutch mechanism, a latch for locking the cam device in one position, means for automatically retracting said latch, connections between the cam device and the shifting shell, and mechanism for moving the members of the clutch mechanism into engagement.

48. In a molding-machine, a sand-box, a shifting shell, means for guiding the shifting shell in central position when traveling, a shaft having one member of a clutch device, means for rotating said shaft, a cam device loosely mounted on the shaft and having the other member of the clutch mechanism, connections between the cam device and the shifting shell, and mechanism for moving the members of the clutch mechanism into engagement.

49. In a molding-machine, a sand-box, a shifting shell, means for preventing tipping of the shifting shell, a shaft having one member of a clutch device, means for rotating said shaft, a cam device loosely mounted on the shaft and having the other member of the clutch mechanism, connections between the cam device and the shifting shell, and mechanism for moving the members of the clutch mechanism into engagement.

50. In a molding-machine, a sand-box, a shifting shell, means for moving said shell, a clutch mechanism for actuating said shell-moving means, and spring mechanism for normally retaining said clutch mechanism in inoperative position.

51. In a molding-machine, a flask-supporting table, a false-flask device, means for reciprocating said false-flask device, and means for imparting the movement of the false-flask device to the flask-supporting table when said false-flask device is moving in one direction.

52. In a molding-machine, a movable flask-supporting table having projections, false-flask mechanism and a stop-bar on the false-flask mechanism adapted to engage the table projections, whereby the table is intermittently moved by the false-flask mechanism.

53. In a molding-machine, a plurality of hammers, each having a supporting-rod; one of said rods being longer than the others and has support from the frame, and a collar mounted on the longer rod and having radial arms engaging with the other rods.

54. In a molding-machine, a plurality of hammers, each having a supporting-rod; one of which is longer than the others, guides connecting said rods, and a cushion connected to the longer rod.

55. In a molding-machine, a plurality of hammers having supporting-rods one of which is longer than the others and an air-cushioning device attached to the upper extreme of said longer rod.

56. In a molding-machine, a plurality of hammers having supporting rods and guides connecting said hammer-rods, each of which is rigidly fastened to one rod and loosely fastened to another rod.

57. In a molding-machine, a plurality of hammers having supporting rods and guides connecting said hammer-rods, each of which is rigidly fastened to one rod, and has a forked end which straddles another rod.

58. In a molding-machine, a plurality of hammers, each having a supporting-rod and a sectional two-part collar rigidly clamped to one of the supporting-rods and having radial arms provided with bifurcated ends which partially encircle other supporting-rods, substantially as set forth.

59. In a molding-machine, a plurality of hammers and mechanism for permanently locking the hammers in their elevated position, comprising a rock-shaft, a main shaft, a crank on said rock-shaft having a roller, a locking-lever loosely mounted on the main shaft and having a notch in which the roller is adapted to fit to lock the rock-shaft against partial rotation.

60. In a molding-machine, a plurality of hammers having transverse and longitudinal bottom grooves adapted to receive flask connections, substantially as set forth.

61. In a molding-machine, a rectangular set of hammers arranged in groups and each group comprising exterior hammers, and an interior hammer and the hammers of each group having a supporting-rod and the rods of the exterior hammers of each group having common support from the supporting-rod of the interior hammer, substantially as set forth.

62. In a molding-machine, ramming-hammers having supporting-rods, one of which is provided with an air-cushion and supports and cushions the other rods.

63. In a molding-machine, a hammer having a groove provided with a bottom surface 287, which slants outwardly and upwardly through the side of the hammer, substantially as set forth.

64. In a molding-machine, a flask-supporting table, patterns on said table and a plurality of ramming-hammers having a pressing-surface corresponding to the angular form of the pattern, and having transverse and longitudinal grooves for the passage of flask connections.

65. In a molding-machine, a flask-supporting table, means for intermittently rotating said table, ramming mechanism, automatic mechanism for operating said ramming mechanism during an intermission of movement of the table, a support for the flask-supporting table beneath the ramming mechanism, and automatic mechanism for elevating said support against the table to temporarily support said table when the ramming mechanism is operating.

66. In a molding-machine, a flask-supporting table, ramming mechanism, a support for the flask-supporting table beneath the ramming mechanism and means automatically operated by the machine for elevating said support against the table to support said table during the operation of the ramming mechanism.

67. In a molding-machine, a flask-supporting table, ramming-hammers, and a support for the flask-supporting table during the operation of the ramming-hammers, comprising a base, supporting parts and mechanism automatically operated from the machine, for lifting the supporting parts against the flask-supporting table.

68. In a molding-machine, a flask-supporting table, ramming-hammers, and a support for the flask-supporting table during the operation of the ramming-hammers, comprising a base, a rock-shaft having support from the base, cams on said rock-shaft, supporting parts adapted to be elevated by the cams against the flask-supporting table and means automatically operated from the machine for rocking the rock-shaft.

69. In a molding-machine, a flask-supporting table, means for intermittently rotating said table, lock-lugs arranged in pairs projecting from said table, and a crank-arm automatically operated from the machine and adapted to be moved between a pair of lock-lugs at the termination of each intermittent movement of the table.

70. In a molding-machine, a table, means for intermittently moving said table, lock-lugs arranged in pairs projecting from said table, a rock-shaft having a crank-arm and mechanism automatically operated from the machine for rocking the rock-shaft to move the crank-arm between the adjacent pair of lock-lugs.

71. In a molding-machine, a flask-supporting table, a false-flask device having means for intermittently moving the table, a friction-block, mechanism operated automatically from the machine for applying the friction-block and stopping the table at the limit of its intermittent movement.

72. In a molding-machine, a flask-supporting table, an inner annular ring on said table, a false-flask device having means for intermittently moving said table, a friction-block and automatic means for moving the friction-block against the annular ring at the limit of the intermittent movements.

73. In a molding-machine, a flask-supporting table, an inner annular ring on said table, means for intermittently moving said table, a bar having an inclined edge, means for reciprocating the bar, and a vertical shaft having a roller engaging the inclined edge of the bar and a block adapted to frictionally engage the annular ring.

74. In a molding-machine, a flask-supporting table having a ring, a false-flask device having means for intermittently moving said table, and a friction-block adapted to be moved against the ring at the limit of the intermittent movements.

75. In a molding-machine, a flask-supporting table, means for intermittently moving said table, a bar, means for reciprocating the bar and a shaft having a roller engaging the edge of the bar and a block adapted to frictionally engage the table.

JESSE A. FIELD.

Witnesses:
L. M. SANGSTER,
A. J. SANGSTER.